(12) United States Patent
Davis et al.

(10) Patent No.: US 11,299,274 B1
(45) Date of Patent: Apr. 12, 2022

(54) AIRCRAFT PASSENGER COMPARTMENT WITH AN ACCESSIBILITY DOOR

(71) Applicant: B/E Aerospace, Inc., Winston-Salem, NC (US)

(72) Inventors: Lyle T. Davis, Pfafftown, NC (US); Michael R. G. Warwick, Randleman, NC (US); Anthony H Disher, III, Winston Salem, NC (US); John C. Jesmok, II, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 145 days.

(21) Appl. No.: 16/779,136

(22) Filed: Jan. 31, 2020

(51) Int. Cl.
*B64D 11/06* (2006.01)
*A61G 3/02* (2006.01)

(52) U.S. Cl.
CPC ...... *B64D 11/0606* (2014.12); *B64D 11/0601* (2014.12); *B64D 11/0644* (2014.12); *A61G 3/02* (2013.01)

(58) Field of Classification Search
CPC ........................ B64D 11/0606; B64D 11/0644
See application file for complete search history.

(56) References Cited

U.S. PATENT DOCUMENTS

| | | | |
|---|---|---|---|
| 7,252,268 B2 | 8/2007 | Saint-Jalmes | |
| 2016/0298370 A1* | 10/2016 | Druckman | ............ E06B 3/4636 |
| 2017/0106980 A1* | 4/2017 | Kuyper | ............... B64D 11/0604 |
| 2017/0283064 A1* | 10/2017 | Robinson | .............. B64C 1/1423 |
| 2018/0281963 A1* | 10/2018 | Dowty | .................. B64C 1/1461 |
| 2019/0210733 A1* | 7/2019 | Herault | .............. B64D 11/0604 |
| 2019/0322371 A1 | 10/2019 | Dowty et al. | |
| 2019/0329891 A1* | 10/2019 | Bonnefoy | .......... B64D 11/0023 |
| 2020/0216177 A1* | 7/2020 | White | .............. B64D 11/00153 |

FOREIGN PATENT DOCUMENTS

WO  WO-2021069883 A1 * 4/2021 ......... B64D 11/0606

\* cited by examiner

*Primary Examiner* — Tye William Abell
(74) *Attorney, Agent, or Firm* — Suiter Swantz pc llo

(57) ABSTRACT

An aircraft passenger compartment may include an accessibility door, a privacy shell, a privacy shell base, and an aircraft seat. The accessibility door may be coupled to the privacy shell via at least one actuation assembly. The accessibility door may be configured to actuate between an open position and a closed position via the at least one actuation assembly. The privacy shell may be coupled to the privacy shell base. At least a portion of the privacy shell may be configured to conform to at least a portion of the aircraft seat. The privacy shell base may be configured to support the accessibility door at a height above a floor of an aircraft cabin including the aircraft passenger compartment. The height may be selected to allow access to the aircraft seat over the privacy shell base when the accessibility door is in the open position.

13 Claims, 22 Drawing Sheets

AIRCRAFT PASSENGER COMPARTMENT WITH AN ACCESSIBILITY DOOR

BACKGROUND

Select aircraft passenger compartments may include an aircraft seat surrounded at least in part by a privacy shell or privacy wall. A person with disabilities may find it difficult to enter the aircraft seat due to the privacy shell where the privacy shell includes unmovable privacy shell elements. In addition, a crew member may have difficulty assisting the person with disabilities get into the aircraft seat where the privacy shell includes unmovable privacy shell elements.

SUMMARY

An aircraft passenger compartment is disclosed, in accordance with one or more embodiments of the disclosure. The aircraft passenger compartment may include an accessibility door. The aircraft passenger compartment may include a privacy shell. The accessibility door may be coupled to the privacy shell via at least one actuation assembly. The accessibility door may be configured to actuate between an open position and a closed position via the at least one actuation assembly. The aircraft passenger compartment may include an aircraft seat. The aircraft passenger compartment may include a privacy shell base. The privacy shell may be coupled to the privacy shell base. At least a portion of the privacy shell may be configured to conform to at least a portion of the aircraft seat. The privacy shell base may be configured to support the accessibility door at a height above a floor of an aircraft cabin including the aircraft passenger compartment. The height may be selected to allow access to the aircraft seat over the privacy shell base when the accessibility door is in the open position.

In some embodiments, the at least one actuation assembly may include at least one rotation assembly. The accessibility door may include a range of actuation having an angle of rotation configured to change as the accessibility door actuates between the open position and the closed position. The accessibility door may be configured to actuate between the open position and the closed position via the at least one rotation assembly.

In some embodiments, the at least one rotation assembly may include a first linkage and a second linkage. The first linkage and the second linkage may each be coupled to the privacy shell. The first linkage and the second linkage may each be coupled to the accessibility door.

In some embodiments, the first linkage may be greater in length than the second linkage.

In some embodiments, at least one of the first linkage or the second linkage may include a curved section.

In some embodiments, the at least one actuation assembly may include at least one rotation assembly. The accessibility door may include a range of actuation having an angle of rotation configured to change as the accessibility door actuates between the open position and the closed position. The accessibility door may include at least one translation assembly. The accessibility door and the privacy shell may be separated by a distance configured to change as the accessibility door actuates between the open position and the closed position. The accessibility door may be configured to actuate between the open position and the closed position via the at least one rotation assembly and the at least one translation assembly.

In some embodiments, the at least one translation assembly may include at least one track and at least one slider. The at least one slider may be configured to actuate along the at least one track.

In some embodiments, the at least one track may be coupled to the privacy shell base. The at least one slider may be coupled to the accessibility door.

In some embodiments, the privacy shell may include one or more privacy shell elements. At least one privacy shell element of the one or more privacy shell elements may be configured to conform to the at least the portion of the aircraft seat.

In some embodiments, the aircraft passenger compartment may include an armrest. The armrest may be configured to be actuated between a stowed position and a deployed position. The armrest may be configured to be in the stowed position to allow access to the aircraft seat over the armrest when the accessibility door is in the open position.

In some embodiments, the privacy shell base may be configured to conform to a portion of the armrest when the armrest is in the stowed position.

In some embodiments, a top surface of the privacy shell base and a top surface of the armrest may be the height from the floor of the aircraft cabin.

In some embodiments, the aircraft passenger compartment may include an interlocking assembly. The interlocking assembly may be configured to couple the accessibility door to the privacy shell base when the accessibility door is in the closed position.

In some embodiments, the accessibility door may be configured to operate as a privacy shell element of the privacy shell when the accessibility door is in the closed position and the interlocking assembly couples the accessibility door to the privacy shell base.

An aircraft passenger compartment is disclosed, in accordance with one or more embodiments of the disclosure. The aircraft passenger compartment may include an accessibility door. The aircraft passenger compartment may include a privacy shell. The accessibility door may be coupled to the privacy shell via at least one actuation assembly. The accessibility door may be configured to actuate between an open position and a closed position via the at least one actuation assembly. The aircraft passenger compartment may include an aircraft seat. The aircraft passenger compartment may include a privacy shell base. The privacy shell may be coupled to the privacy shell base. At least a portion of the privacy shell may be configured to conform to a backrest of the aircraft seat. The privacy shell base may be configured to support the accessibility door at a height above a floor of an aircraft cabin including the aircraft passenger compartment. The height may be selected to allow access to the aircraft seat over the privacy shell base when the accessibility door is in the open position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
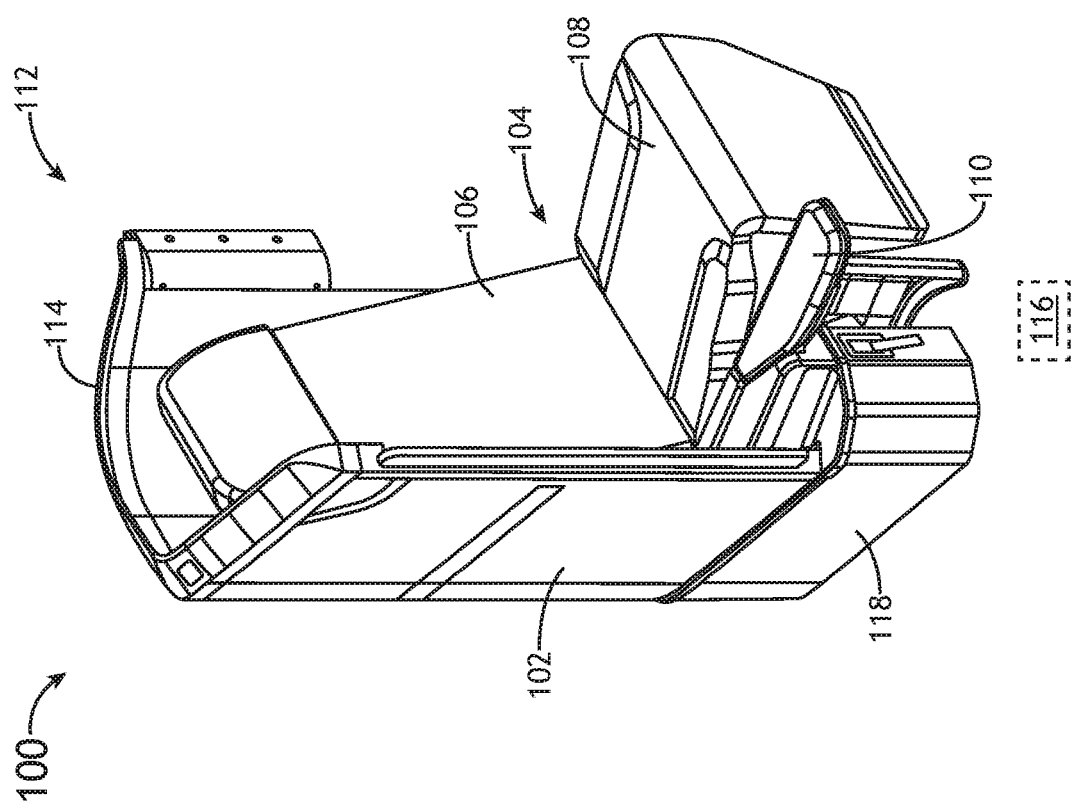
FIG. 1A illustrates an aircraft passenger compartment with an accessibility door, in accordance with one or more embodiments of the disclosure.
Figure 1B:
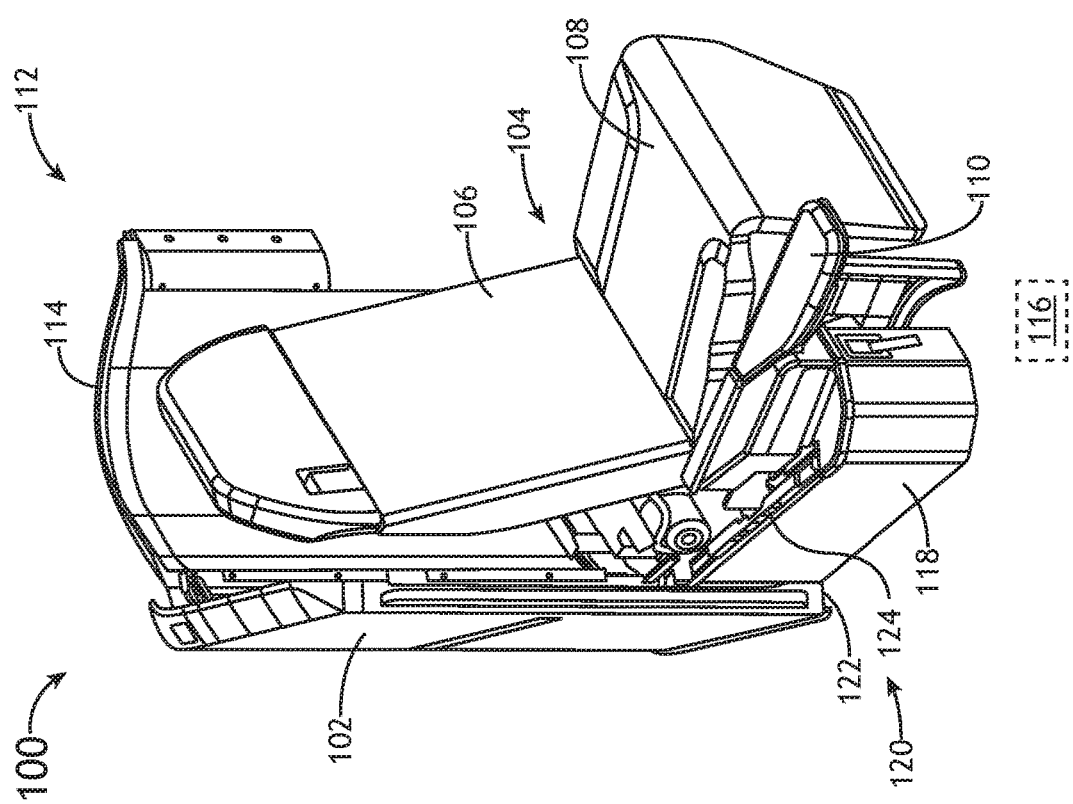
FIG. 1B illustrates an aircraft passenger compartment with an accessibility door, in accordance with one or more embodiments of the disclosure.
Figure 1C:
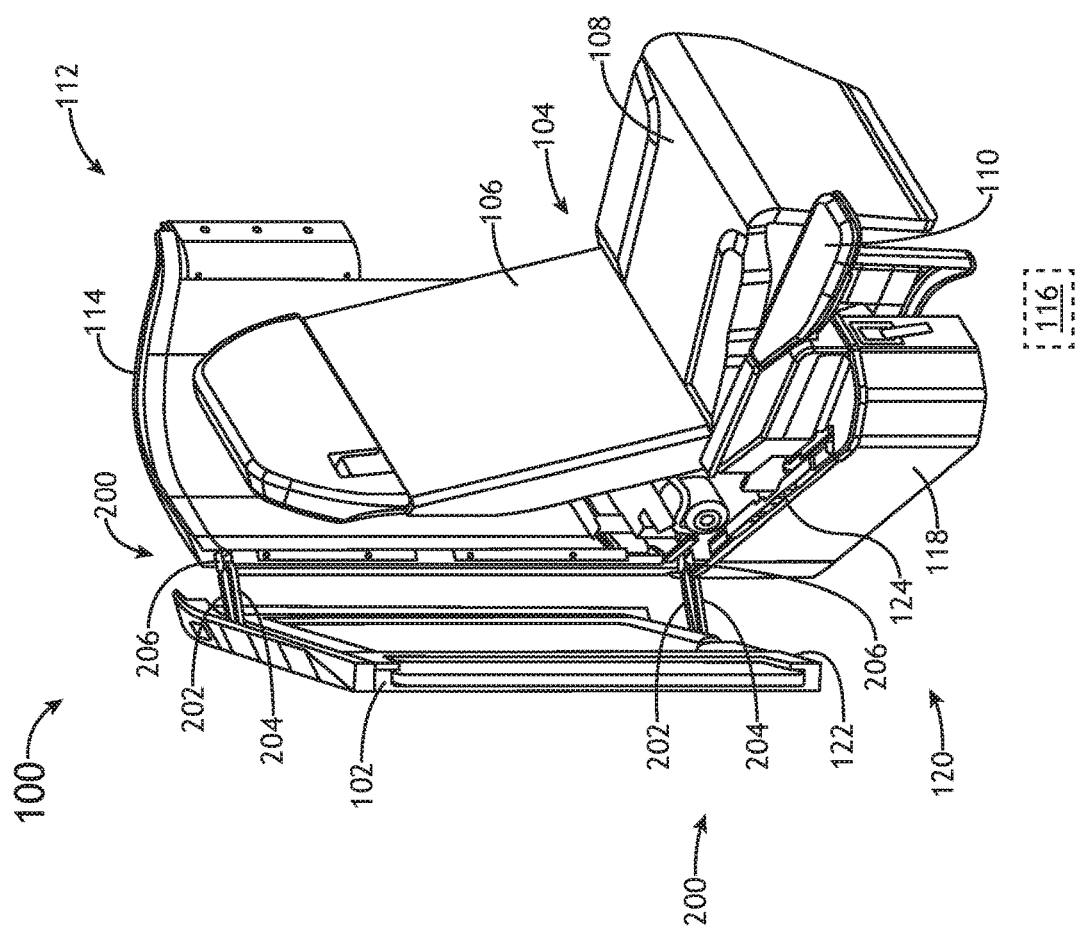
FIG. 1C illustrates an aircraft passenger compartment with an accessibility door, in accordance with one or more embodiments of the disclosure.
Figure 1D:
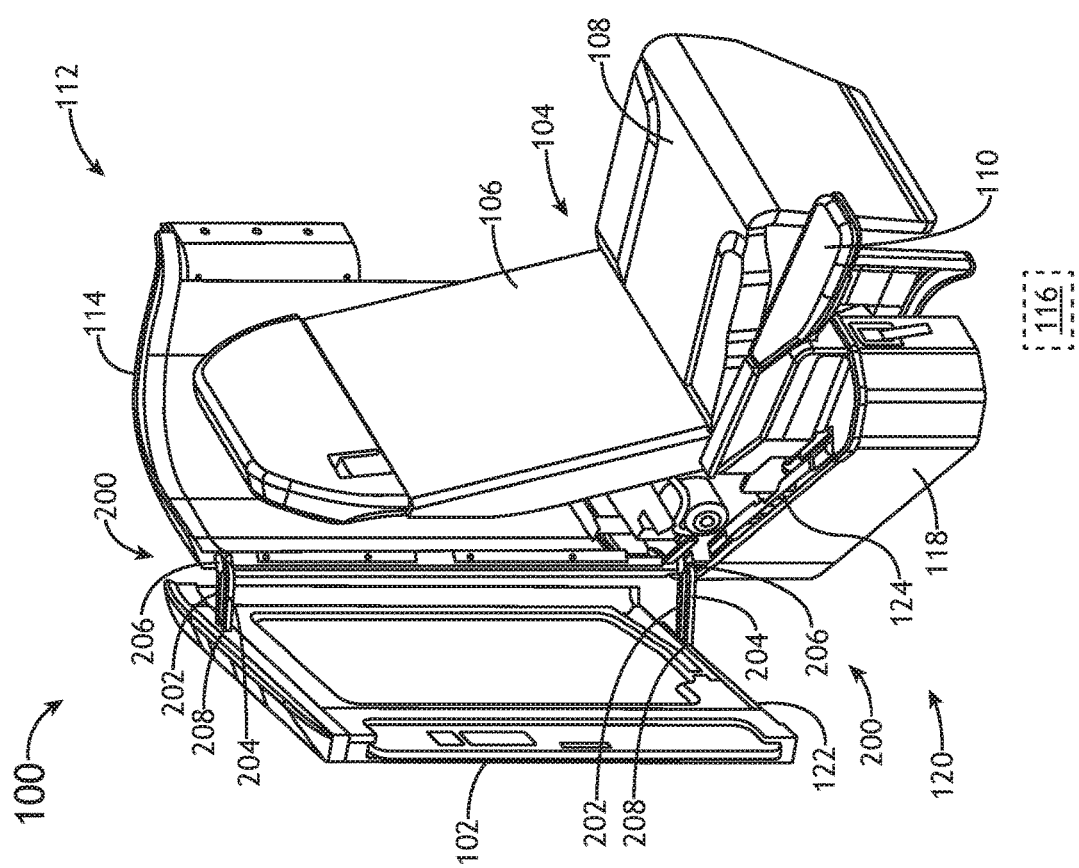
FIG. 1D illustrates an aircraft passenger compartment with an accessibility door, in accordance with one or more embodiments of the disclosure.
Figure 1E:
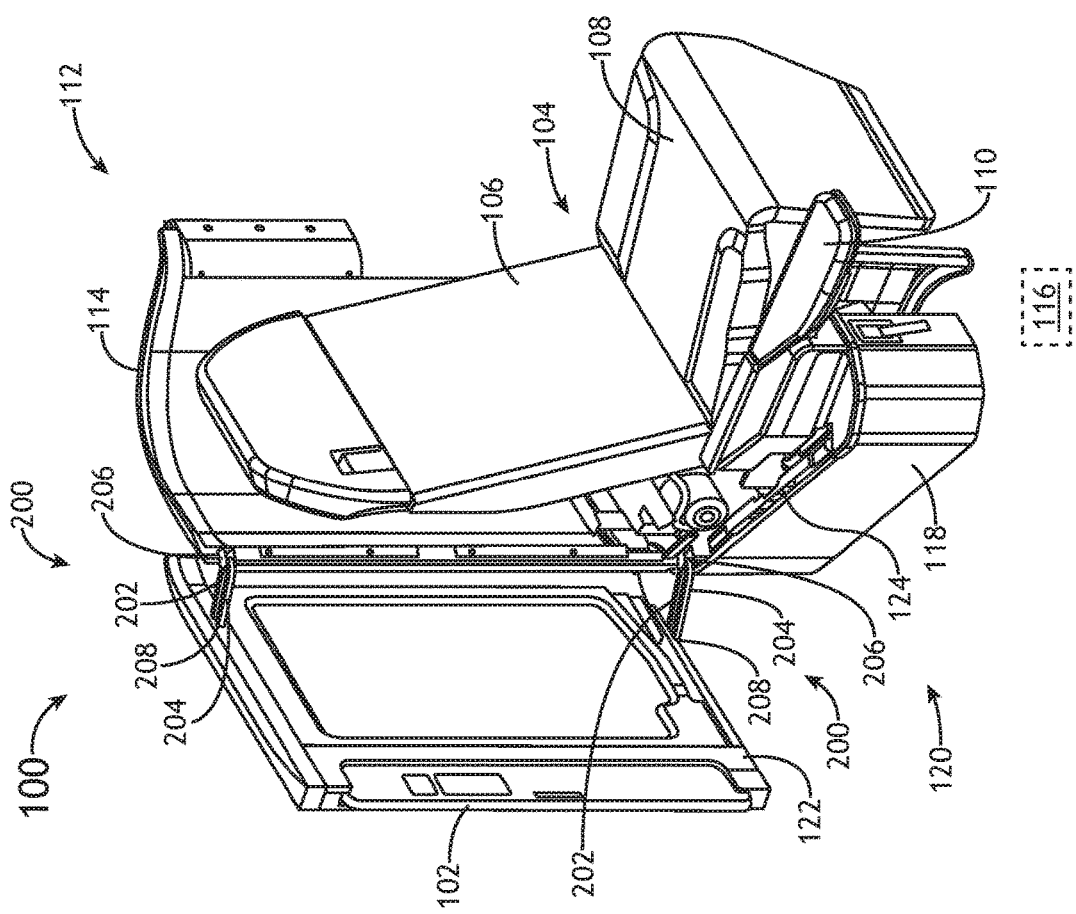
FIG. 1E illustrates an aircraft passenger compartment with an accessibility door, in accordance with one or more embodiments of the disclosure.
Figure 2A:
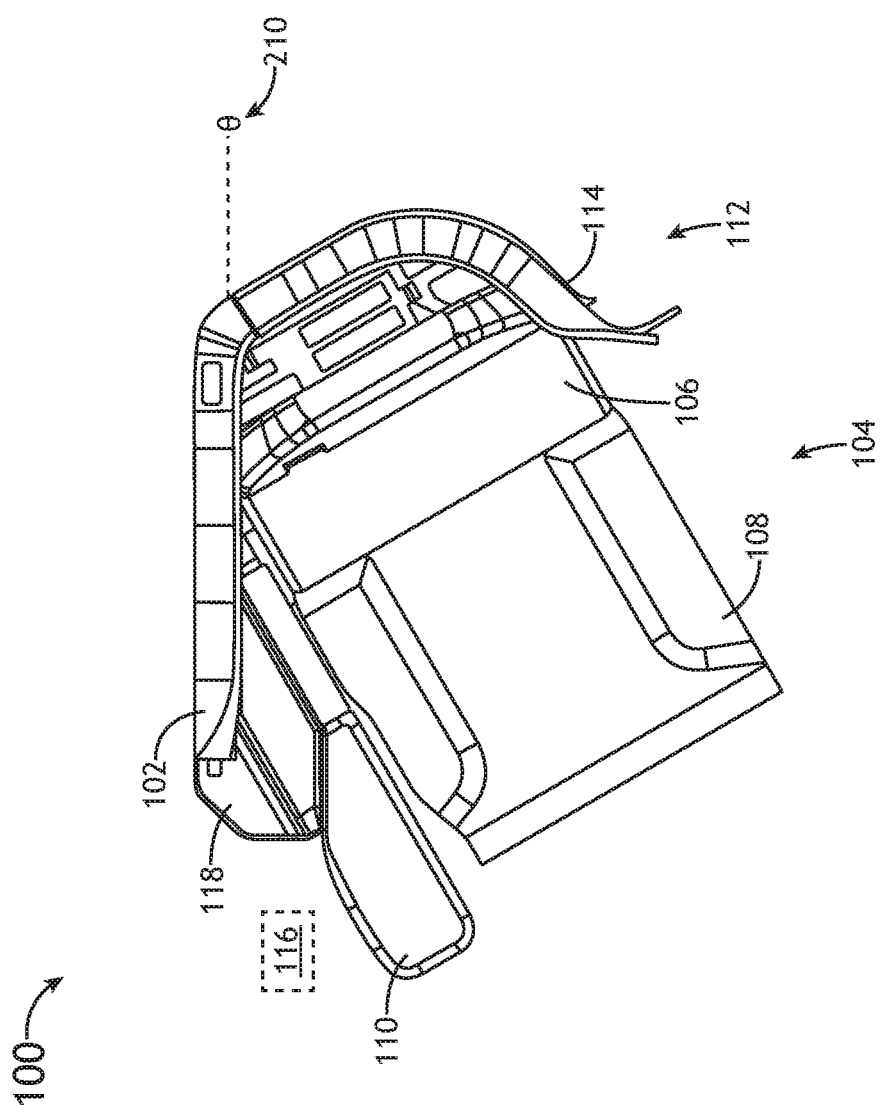
FIG. 2A illustrates an aircraft passenger compartment with an accessibility door, in accordance with one or more embodiments of the disclosure.
Figure 2B:
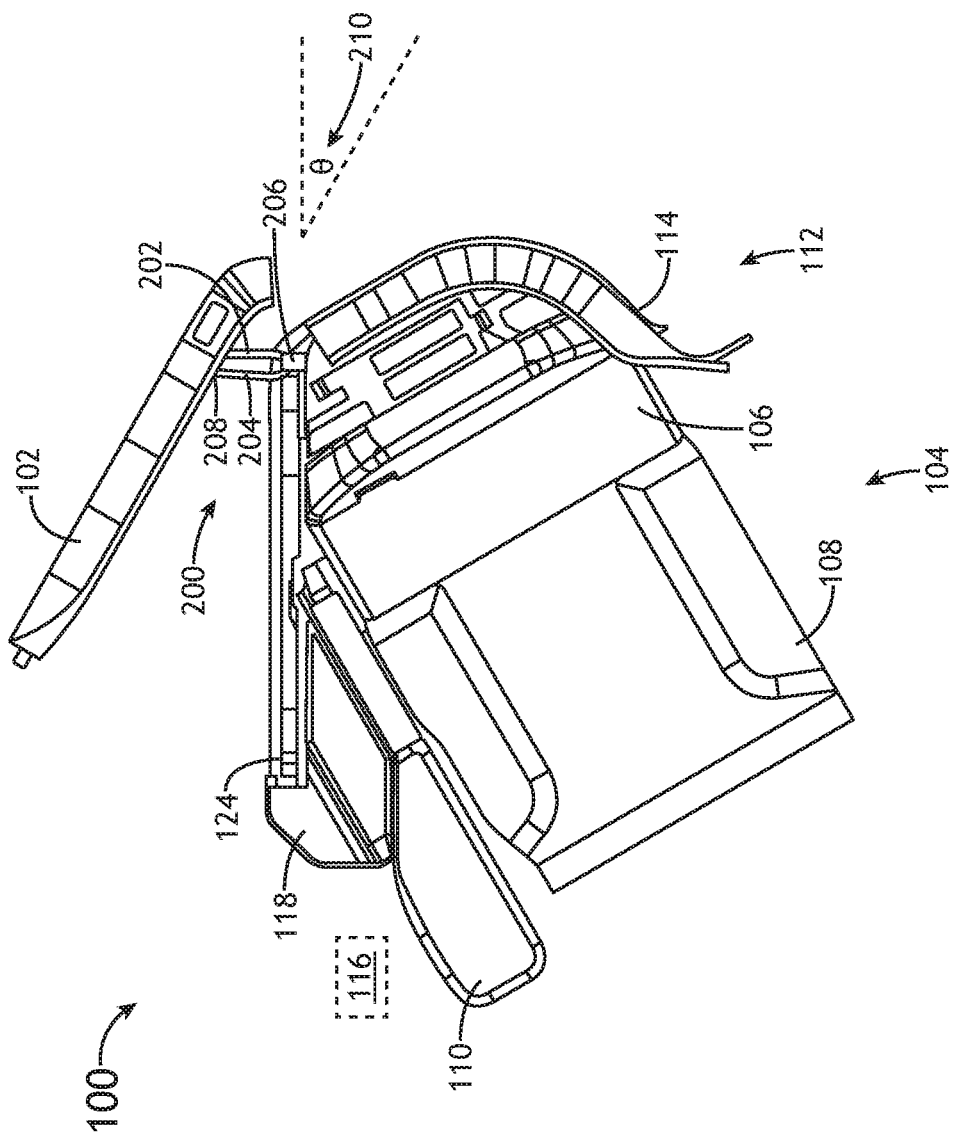
FIG. 2B illustrates an aircraft passenger compartment with an accessibility door, in accordance with one or more embodiments of the disclosure.
Figure 2C:
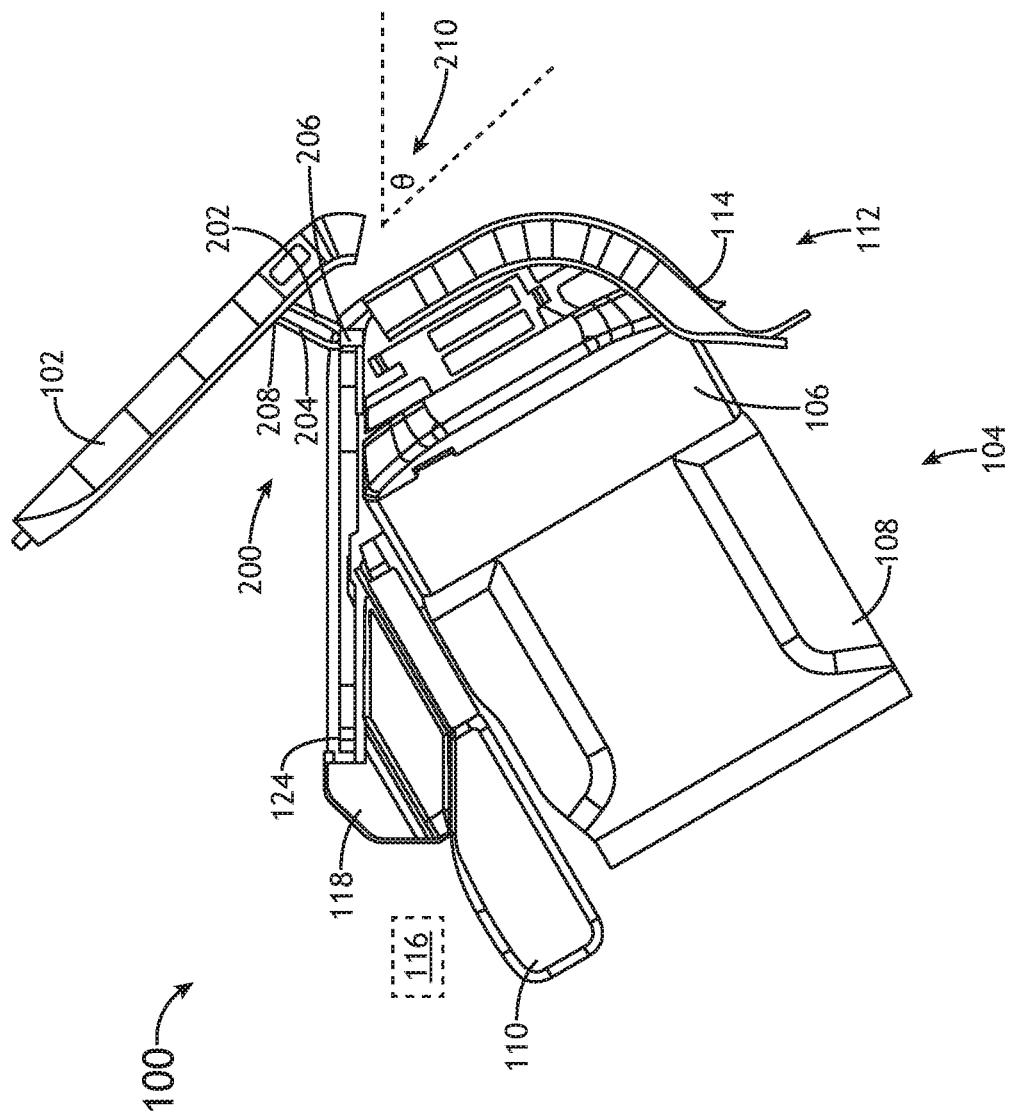
FIG. 2C illustrates an aircraft passenger compartment with an accessibility door, in accordance with one or more embodiments of the disclosure.
Figure 2D:
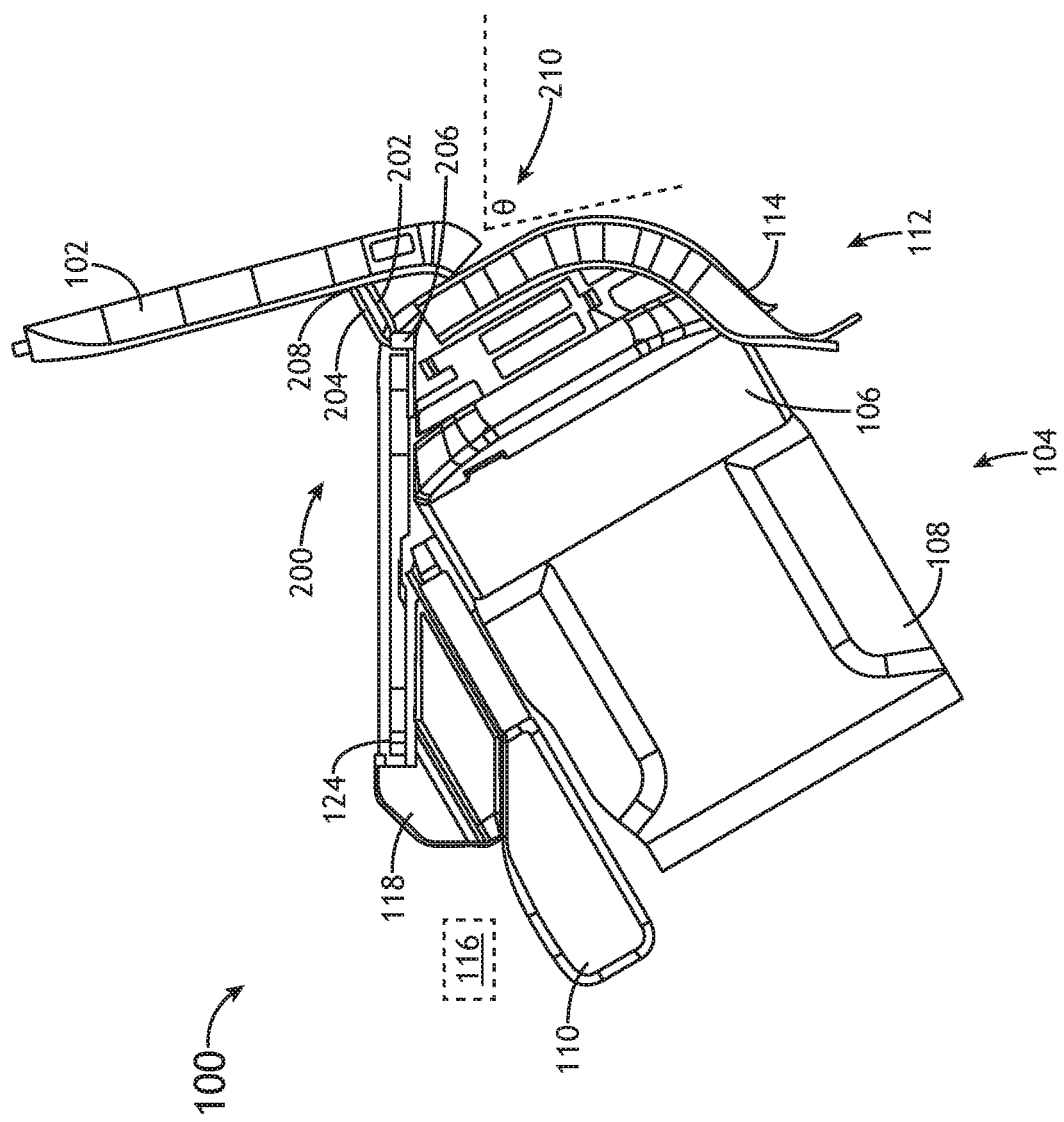
FIG. 2D illustrates an aircraft passenger compartment with an accessibility door, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-6B generally illustrate an aircraft passenger compartment 100 with an accessibility door 102, in accordance with one or more embodiments of the disclosure.

Select aircraft passenger compartments may include an aircraft seat surrounded at least in part by a privacy shell or privacy wall. A person with disabilities may find it difficult to enter the aircraft seat due to the privacy shell where the privacy shell includes unmovable privacy shell elements. In addition, a crew member may have difficulty assisting the person with disabilities get into the aircraft seat where the privacy shell includes unmovable privacy shell elements.

The select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be beneficial to provide an aircraft passenger compartment with an accessibility door that allows for increased access for persons with disabilities, for crew members assisting persons with disabilities, or the like. In addition, it would be beneficial to provide an aircraft passenger compartment with an accessibility door that meets aviation guidelines and/or standards (e.g., passenger accessibility requirements, or the like). Further, it would be beneficial to provide an aircraft passenger compartment with an accessibility door configured to reduce aisle blockage when the accessibility door is in an open position.

The aircraft passenger compartment 100 may include an aircraft seat 104. The aircraft seat 104 may include one or more seat sections. For example, the aircraft seat 104 may include a seatback 106 and a seat pan 108. By way of another example, the aircraft seat 104 may include a primary seat section and an auxiliary seat section. By way of another example, the aircraft seat 104 may include a single seat section. In general, the aircraft seat 104 may include any number of sections.

The aircraft seat 104 may be translatable (e.g., trackable or slidable). The aircraft seat 104 may be rotatable about an axis cross-wise through the aircraft seat 104 into a position including, but not limited to, an upright or raised position, one or more reclined positions, and/or a bed or lie-flat position. The aircraft seat 104 may be rotatable about an axis (e.g., swivelable). The aircraft seat 104 may be fully positionable between the outer limits of motion as defined by the moveable components of the aircraft seat 104, and/or other components of the aircraft passenger compartment 100. It is noted herein a fully upright or raised position may be considered a taxi, takeoff, or landing (TTOL) position during select stages of flight (though the upright position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 104 may be actuatable (e.g., translatable and/or rotatable) from the TTOL position to a non-TTOL position, and/or vice versa.

It is noted herein the aircraft seat 104 may transition directly between the upright position and the lie-flat position. In addition, it is noted herein the aircraft seat 104 may transition through one or more reclined positions between the upright position and the lie-flat position. Further, it is noted herein the aircraft seat 104 may transition into one or more reclined positions in a motion separate from the transition between the upright position and the lie-flat position. Therefore, the above description should not be interpreted as a limitation on the scope of the disclosure but merely an illustration.

The aircraft passenger compartment 100 may include an armrest 110. The armrest 110 may be actuated between a stowed position and a deployed position. For example, the armrest 110 may be translated along one or more axes (e.g., along a vertical axis) between the stowed position and the deployed position. By way of another example, the armrest 110 may be rotated about one or more axes between the stowed position and the deployed position. By way of another example, the armrest 110 may be actuated via a combination of a translation along one or more axes and a rotation about one or more axes between the stowed position and the deployed position.

The armrest 110 may be in a stowed position when a passenger is entering or exiting the aircraft seat 104. For instance, the armrest 110 may drop to allow a passenger to slide over the armrest 110 when the passenger is entering or exiting the aircraft seat 104. By way of another example, the armrest 110 may be in a deployed position (e.g., in a raised state or a lowered state of the deployed position) when a passenger is occupying the aircraft seat 104. In this regard, the armrest 100 may conform to aviation guidelines and/or standards (e.g., passenger accessibility requirements, or the like).

The aircraft passenger compartment 100 may include a privacy shell 112. The privacy shell 112 may include one or more privacy shell elements 114. A privacy shell element 114 proximate to the aircraft seat 104 may be configured to conform to at least a portion of the aircraft seat 104. For example, the privacy shell element 114 may include a section configured to conform to the backrest 106 of the aircraft seat 104. It is noted herein that conforming to and/or surrounding at least a portion of the aircraft seat 104 may provide an environment with an increased level of privacy for an occupying passenger by preventing access (e.g., physical access, viewing access, or the like) from an aisle or other section of an aircraft cabin in which the aircraft passenger compartment 100 is installed.

The privacy shell 112 may include an opening 116 within the privacy shell 112 to access the aircraft seat 104. The opening 116 may be configured to lead to an aisle of the aircraft cabin. The privacy shell 112 may be coupled to a privacy shell base 118. For example, the one or more privacy shell elements 114 of the privacy shell 112 may be coupled to the privacy shell base 118. It is noted herein, however, that the privacy shell base 118 may be a component of the privacy shell 112 (e.g., integrated within a privacy shell element 114, or the like). Therefore, the above description should not be interpreted as a limitation on the present disclosure but merely an illustration.

The privacy shell 112 may include the accessibility door 102. The accessibility door 102 may be proximate to the privacy shell base 118. The aircraft passenger compartment 100 may include an interlocking assembly 120 configured to couple the accessibility door 102 to the privacy shell base 118 when the accessibility door 102 is in a closed position. For example, the accessibility door 102 may include one or more components 122 of the interlocking assembly 120, and the privacy shell base 118 may include one or more corresponding components 124 of the interlocking assembly 120. In general, the interlocking assembly 120 may be any mechanism or device with components (e.g., actuators such as a handle, a lever, a knob, a button, a toggle, or the like; locking pins such as tabs, protrusions, hooks, or the like;

and/or cut-outs such as a slot, a recess, a notch, a hole, a groove, or the like) configured to meet aviation guidelines and/or standards (e.g., resistance to external force requirements, weight-bearing requirements, load-bearing requirements, or the like).

The accessibility door 102 may operate or act as a privacy shell element 114 when in the closed position. For example, the accessibility door 102 may be coupled to the privacy shell base 118 when in the closed position via the interlocking assembly 120, to allow for the accessibility door 102 to operate as a privacy shell element 114. It is noted herein the interlocking assembly 120 and/or the accessibility door 102 may be configured to meet aviation guidelines and/or standards (e.g., resistance to external force requirements, weight-bearing requirements, load-bearing requirements, or the like) when the accessibility door 102 operates as a privacy shell element 114.

The privacy shell base 118 may be configured to conform to a portion of the armrest 110 when the armrest 110 is in the stowed position. A top surface of the privacy shell base 118 and a top surface of the armrest 110 may be the same or a substantially similar height from a floor of an aircraft cabin including the aircraft passenger compartment 100 when the armrest 110 is in the stowed position.

Where the accessibility door 102 is supported by the privacy shell base 118 at a select height above a floor of an aircraft cabin, a passenger may slide over the privacy shell base 118 and/or the armrest 110 when the armrest 110 is in the stowed position and the accessibility door 102 is in an open position. It is noted herein that the privacy shell base 118 and/or the armrest 110 being a select height above the floor of the aircraft cabin may be desirable to give a passenger a transitional surface (e.g., between a wheelchair and the aircraft seat 104, or the like) when the passenger enters or exits the aircraft passenger compartment 100.

Where the accessibility door 102 extends to a floor surface of an aircraft cabin (e.g., such that there is no privacy shell base 118 or at least a reduced privacy shell base 118), the accessibility door 102 may increase the size of the opening 116 when in an open position.

The accessibility door 102 may be coupled to the privacy shell 112 via one or more actuation assemblies. The one or more actuation assemblies may be configured to cause the accessibility door 102 to rotate and/or translate between the closed position and the open position.

The accessibility door 102 may rotate about one or more axes into an open position against the privacy shell 112 via one or more rotation assemblies. FIGS. 1A-1E and FIGS. 2A-2D illustrate the aircraft passenger compartment 100 including an accessibility door 102 configured to rotate about one or more axes into the open position against the privacy shell 112, in accordance with one or more embodiments of the disclosure.

The one or more actuation assemblies may include one or more rotation assemblies 200. A rotation assembly 200 may include one or more primary linkages 202. The rotation assembly 200 may include one or more auxiliary linkages 204. The one or more primary linkages 202 may be a different length than the one or more auxiliary linkages 204. For example, the one or more primary linkages 202 may be greater in length than the one or more auxiliary linkages 204. By way of another example, the one or more auxiliary linkages 204 may be greater in length than the one or more primary linkages 202. The difference in length may allow for the spacing between the one or more primary linkages 202 and the one or more auxiliary linkages 204 to change as the accessibility door 102 is actuated. The difference in length may require at least some of the one or more primary linkages 202 or the one or more auxiliary linkages 204 to have a curved or bent section. It is noted herein, however, the one or more primary linkages 202 and the one or more auxiliary linkages 204 may be the same length within the rotation assembly 200. In addition, it is noted herein the rotation assembly 200 may only include the one or more primary linkages 202. Therefore, the above description should not be interpreted as a limitation on the present disclosure but merely an illustration.

The one or more primary linkages 202 and/or the one or more auxiliary linkages 204 may be coupled to the privacy shell 112 via one or more hinge joints 206 (e.g., including one or more hinge plates and one or more pins, or the like). The one or more primary linkages 202 and/or the one or more auxiliary linkages 204 may be coupled to the accessibility door 102 via one or more hinge joints 208 (e.g., including one or more hinge plates and one or more pins, or the like).

It is noted herein the one or more primary linkages 202 and/or the one or more auxiliary linkages 204 may be coupled to the privacy shell 112 via one or more hinge joints 206 spaced a select distance on the privacy shell 112. In addition, it is noted herein the one or more primary linkages 202 and/or the one or more auxiliary linkages 204 may be coupled to the accessibility door 102 via different hinge joints 208 spaced a select distance on the accessibility door 102. In this regard, the aircraft passenger compartment 100 may include a four-bar linkage configured to actuate the accessibility door 102 between the closed position and the open position, where the four bars include a primary linkage 202, an auxiliary linkage 204, a portion of the privacy shell 112 between the multiple hinge joints 206, and a portion of the accessibility door 102 between the multiple hinge joints 208.

The accessibility door 102 may include a range of actuation having a select angle of rotation theta ($\theta$) 210 between the closed position and the open position via the one or more rotation assemblies 200. For example, the angle of rotation $\theta$ 210 may range between 0 degrees (e.g., when closed) and 120 degrees (e.g., when open) via the one or more rotation assemblies 200. For instance, the angle of rotation $\theta$ 210 may range between 0 degrees and 80 degrees via the one or more rotation assemblies 200. In general, the angle of rotation $\theta$ 210 may change (e.g., increase or decrease, depending on the direction of actuation) as the accessibility door 102 is actuated between the closed position and the open position via the one or more rotation assemblies 200. For example, as illustrated between FIGS. 2A-2D, the angle of rotation $\theta$ 210 may increase during the transition between the closed position and the open position, and the angle of rotation $\theta$ 210 may decrease during the transition between the open position and the closed position.

It is noted herein the accessibility door 102 may be translated at some point between the transition between the closed position and the open position. For example, the accessibility door 102 may translate outward from the privacy shell 112 a select distance prior to being rotated via the one or more rotation assemblies 200. By way of another example, the accessibility door 102 may translate inward toward the privacy shell 112 a select distance after being rotated via the one or more rotation assemblies 200. By way of another example, the accessibility door 102 may translate outward from the privacy shell 112 and/or inward toward the privacy shell 112 a select distance while being rotated via the one or more rotation assemblies 200. In addition, it is noted herein an arrangement of components of the one or more rotation assemblies 200 may allow for the translation of the accessibility door 102. Therefore, the above description should not be interpreted as a limitation on the present disclosure but merely an illustration.

The accessibility door 102, the privacy shell 112, and/or the one or more rotation assemblies 200 may include one or more actuation inhibitors configured to prevent the accessibility door 102 from opening beyond a select angle.

It is noted herein the accessibility door 102, the privacy shell 112, and/or the one or more rotation assemblies 200 may include components for an interlocking assembly configured to lock the accessibility door 102 in the open position, in addition or instead of interlocking assembly 120 configured to lock the accessibility door 102 in the closed position. Therefore, the above description should not be interpreted as a limitation on the present disclosure but merely an illustration.

Figure 3A:
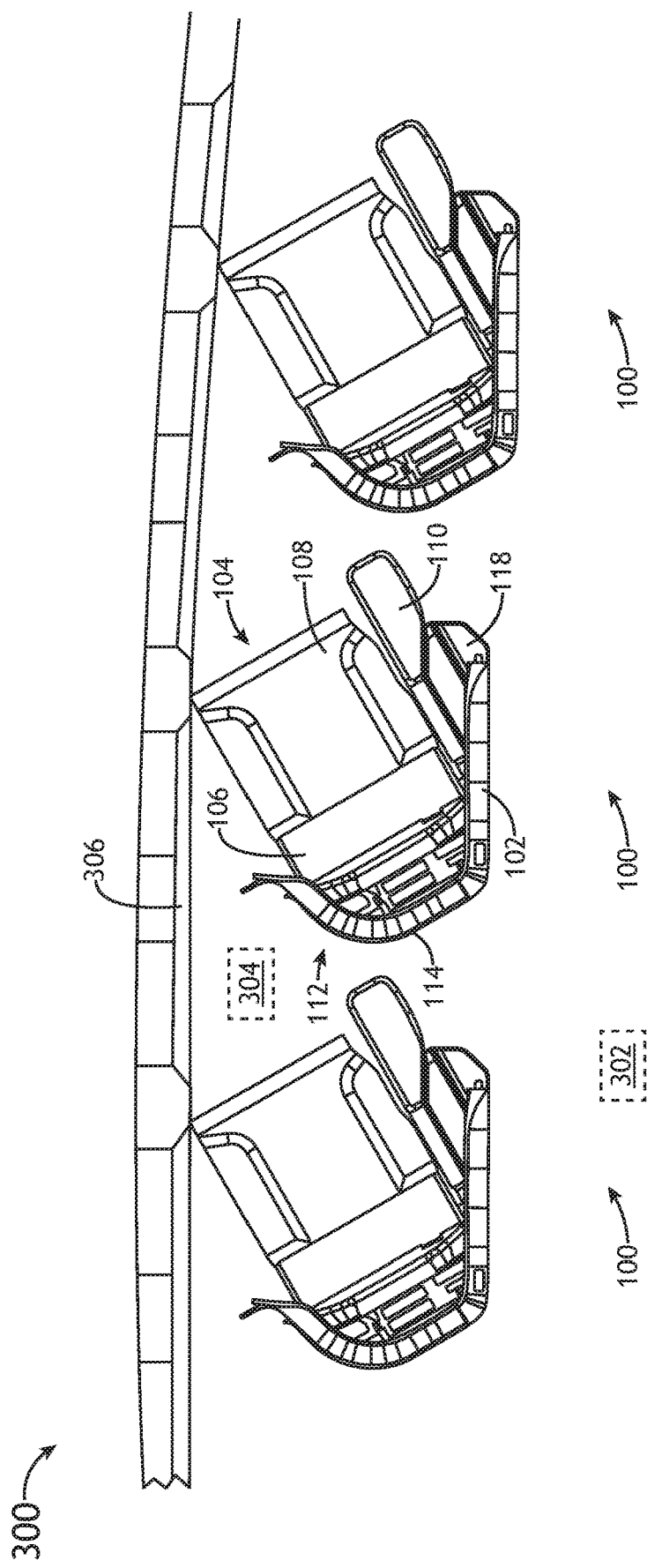
FIG. 3A illustrates an aircraft cabin including an aircraft passenger compartment with an accessibility door, in accordance with one or more embodiments of the disclosure.
Figure 3B:
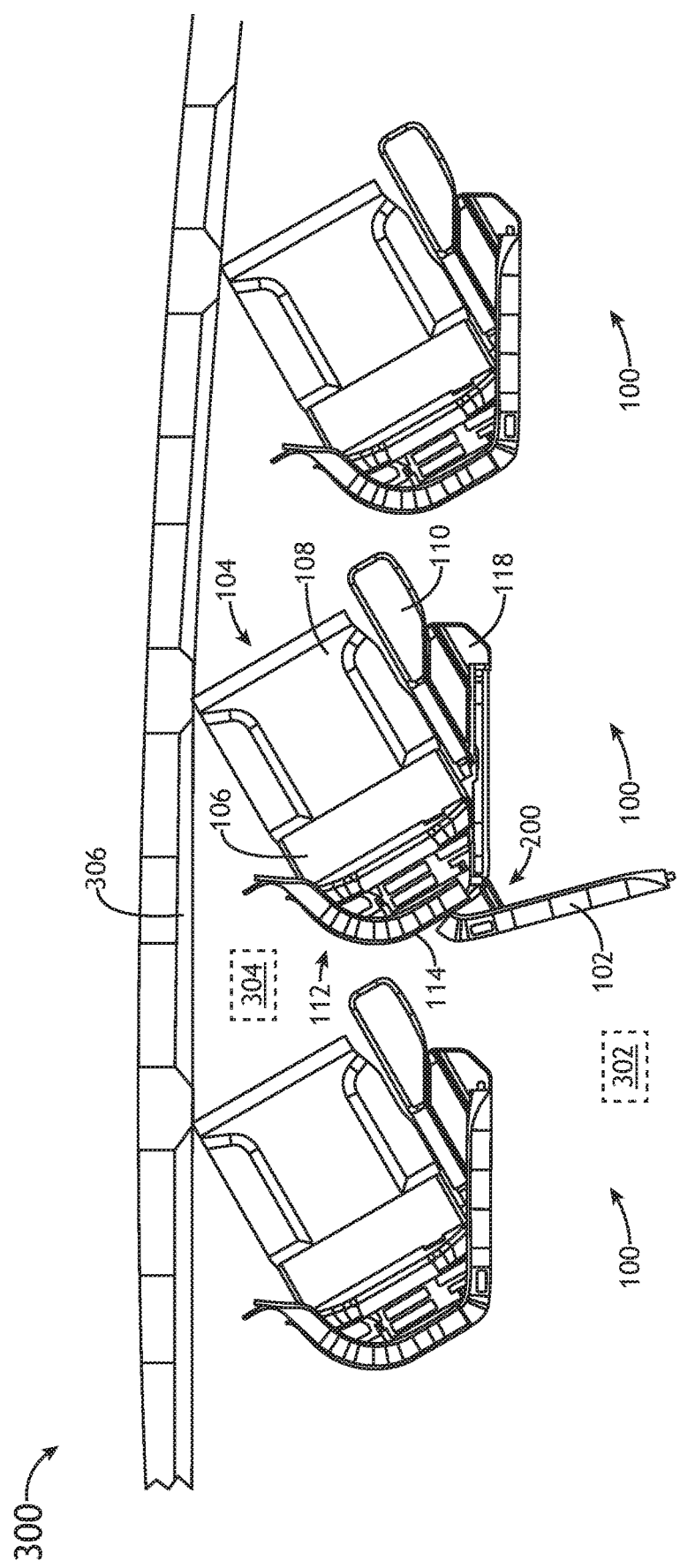
FIG. 3B illustrates an aircraft cabin including an aircraft passenger compartment with an accessibility door, in accordance with one or more embodiments of the disclosure.
Figure 4A:
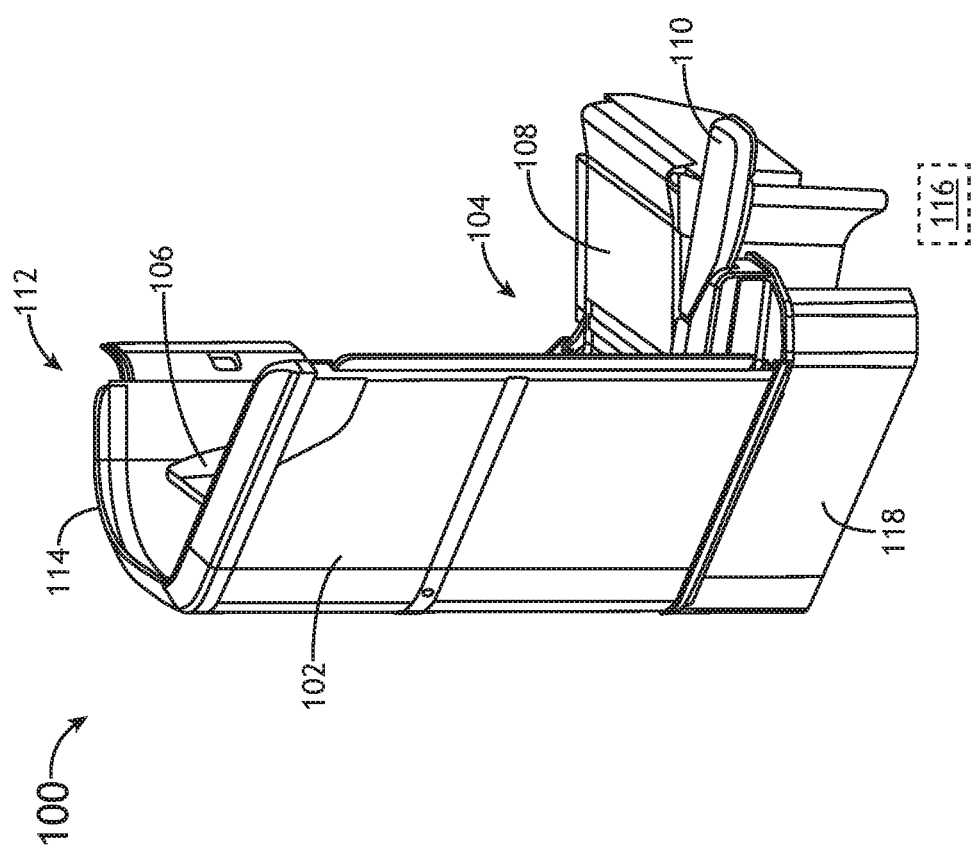
FIG. 4A illustrates an aircraft passenger compartment with an accessibility door, in accordance with one or more embodiments of the disclosure.
Figure 4B:
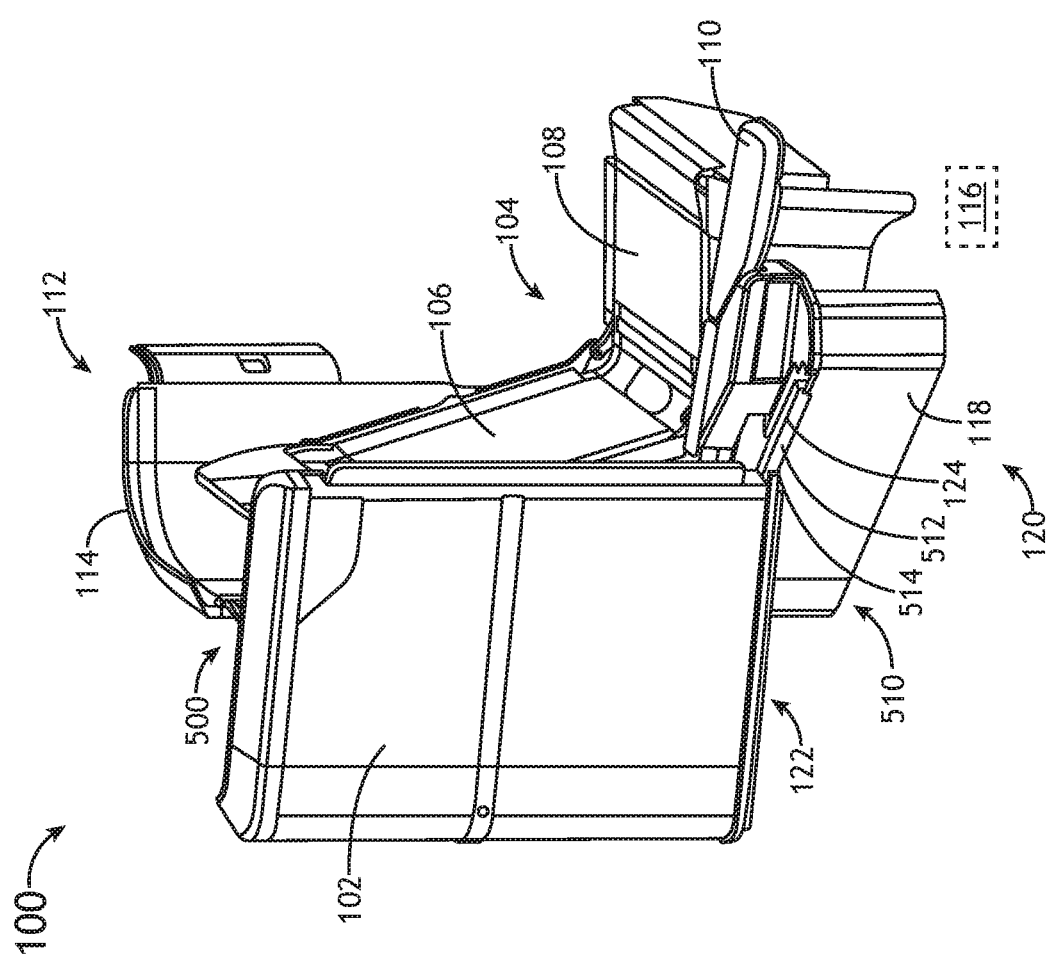
FIG. 4B illustrates an aircraft passenger compartment with an accessibility door, in accordance with one or more embodiments of the disclosure.
Figure 4C:
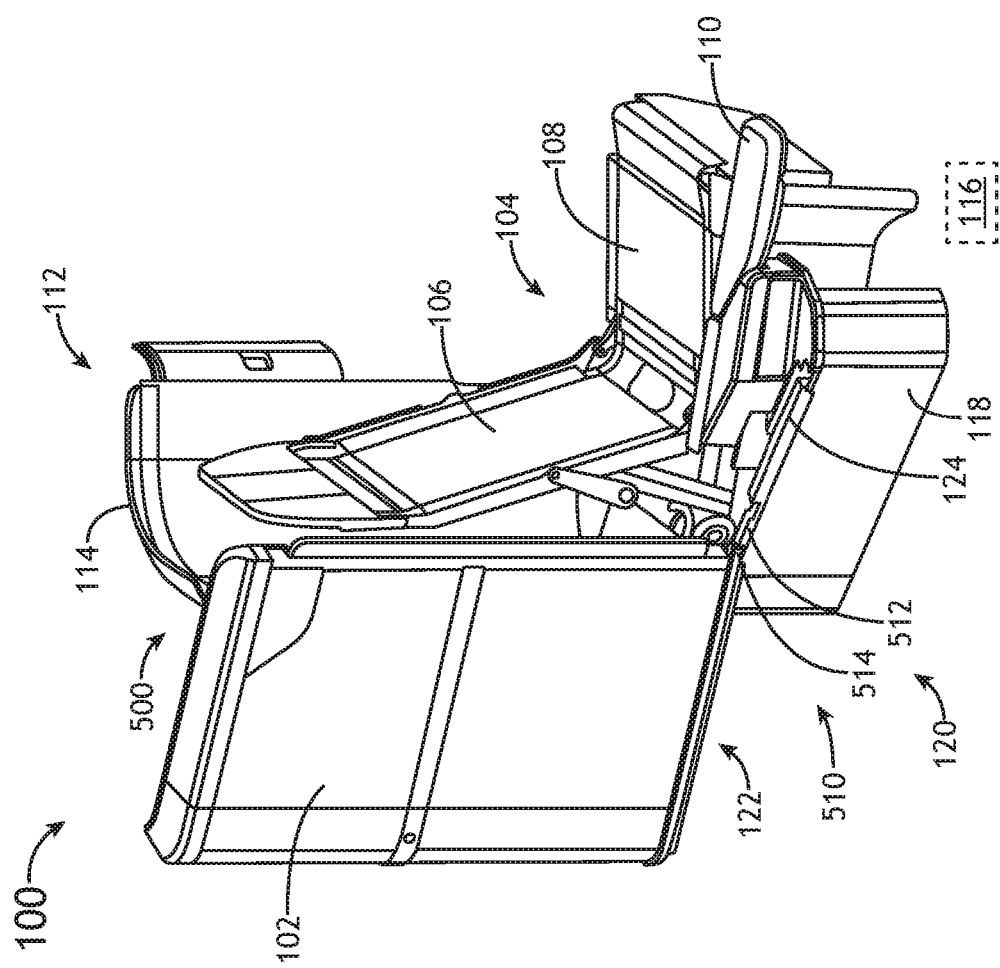
FIG. 4C illustrates an aircraft passenger compartment with an accessibility door, in accordance with one or more embodiments of the disclosure.
Figure 5A:
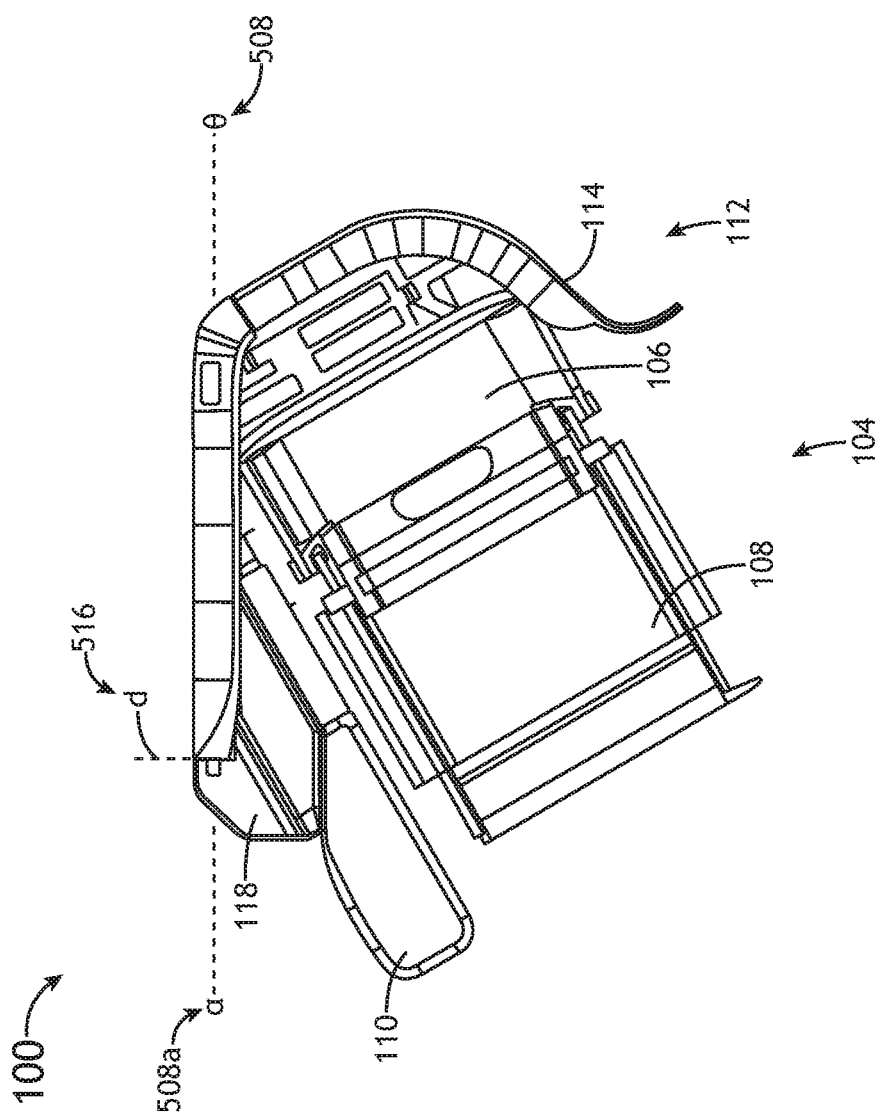
FIG. 5A illustrates an aircraft passenger compartment with an accessibility door, in accordance with one or more embodiments of the disclosure.
Figure 5B:
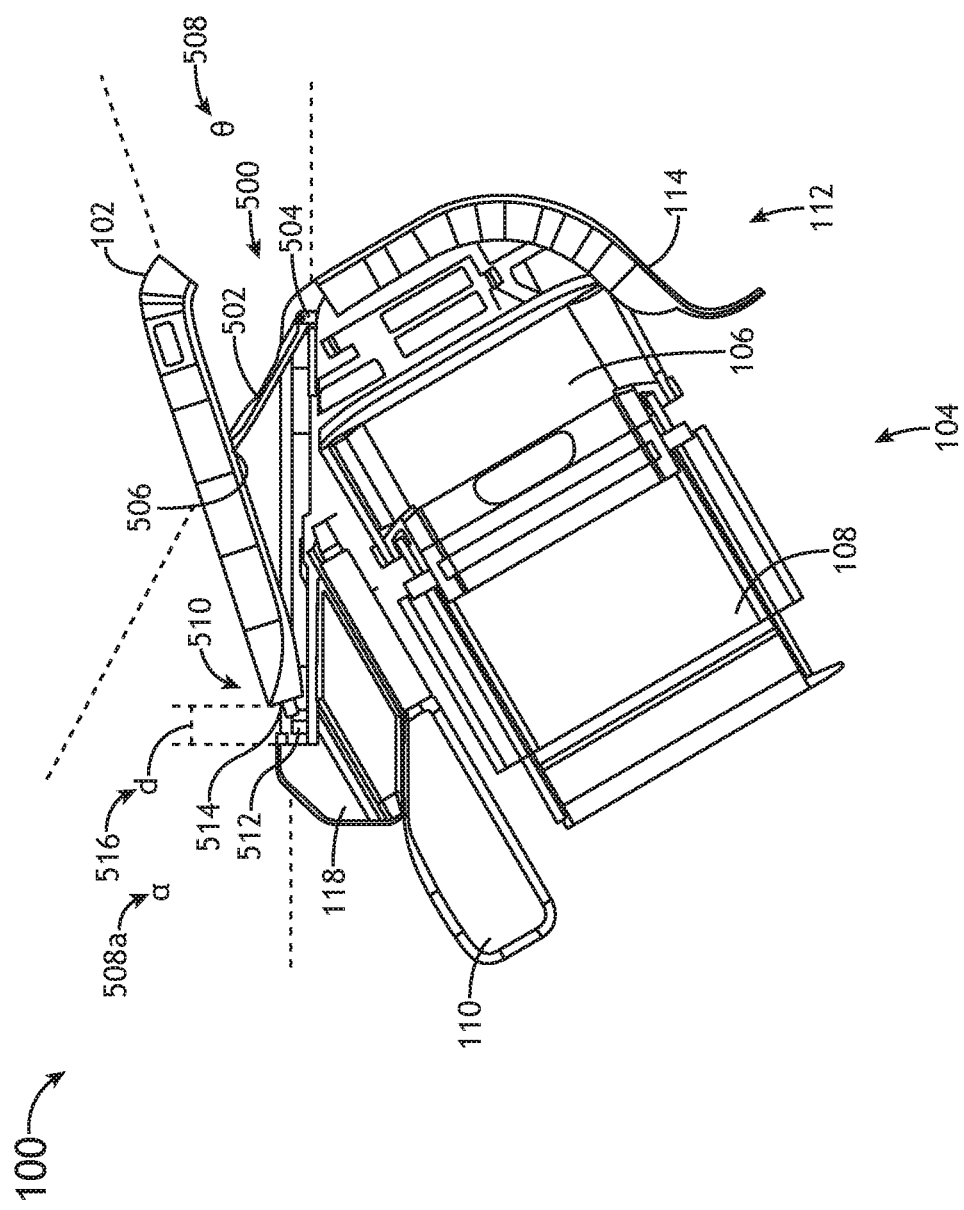
FIG. 5B illustrates an aircraft passenger compartment with an accessibility door, in accordance with one or more embodiments of the disclosure.
Figure 5C:
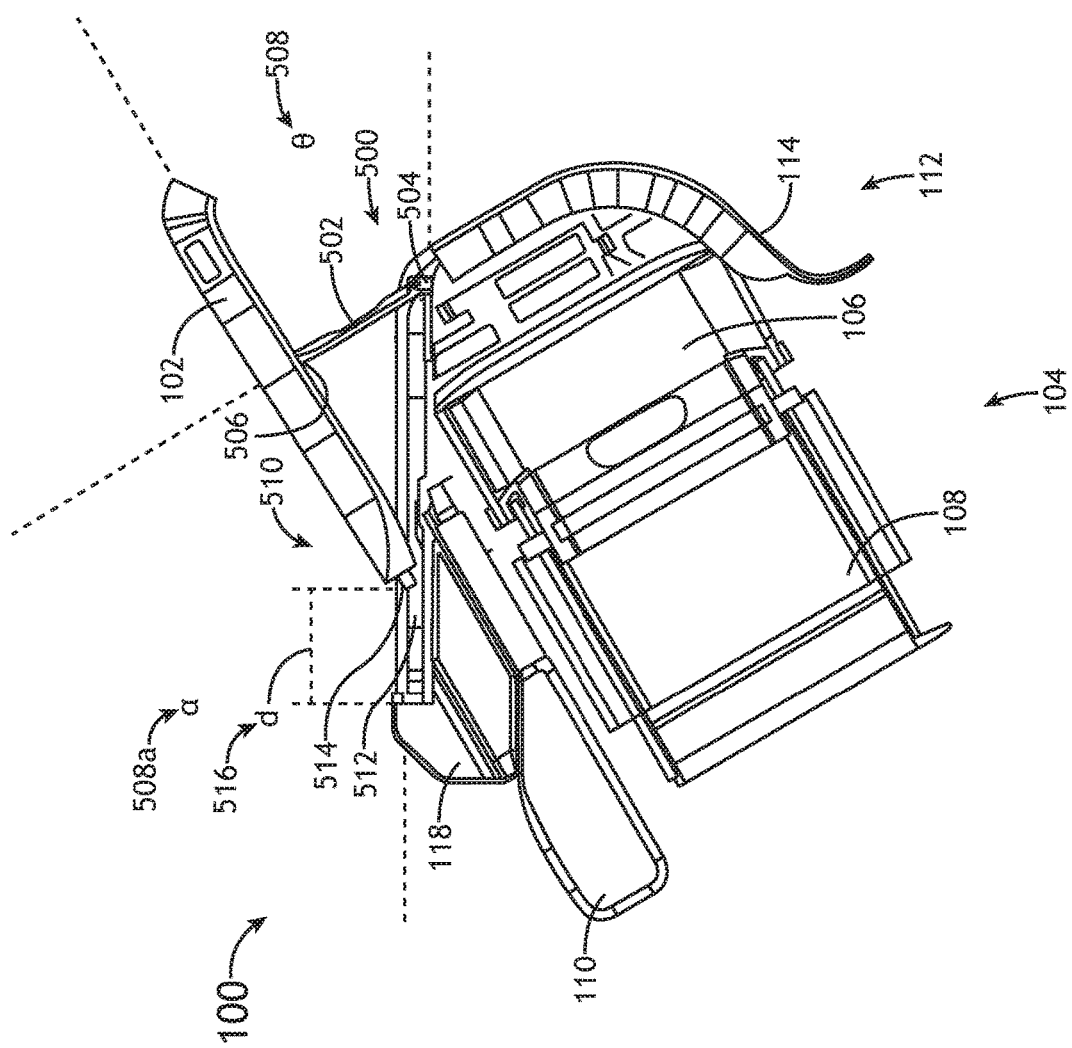
FIG. 5C illustrates an aircraft passenger compartment with an accessibility door, in accordance with one or more embodiments of the disclosure.
Figure 5D:
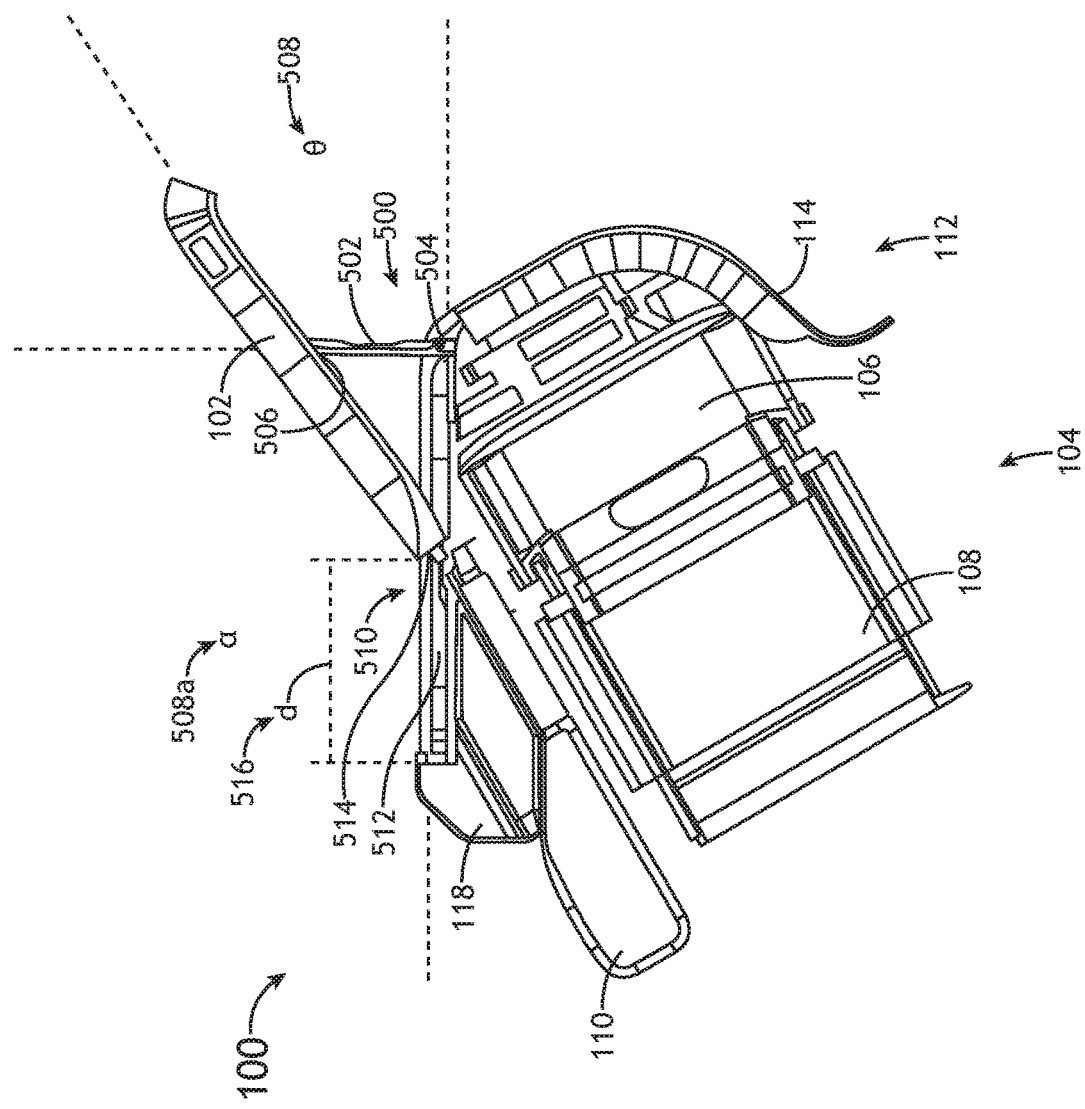
FIG. 5D illustrates an aircraft passenger compartment with an accessibility door, in accordance with one or more embodiments of the disclosure.
Figure 5E:
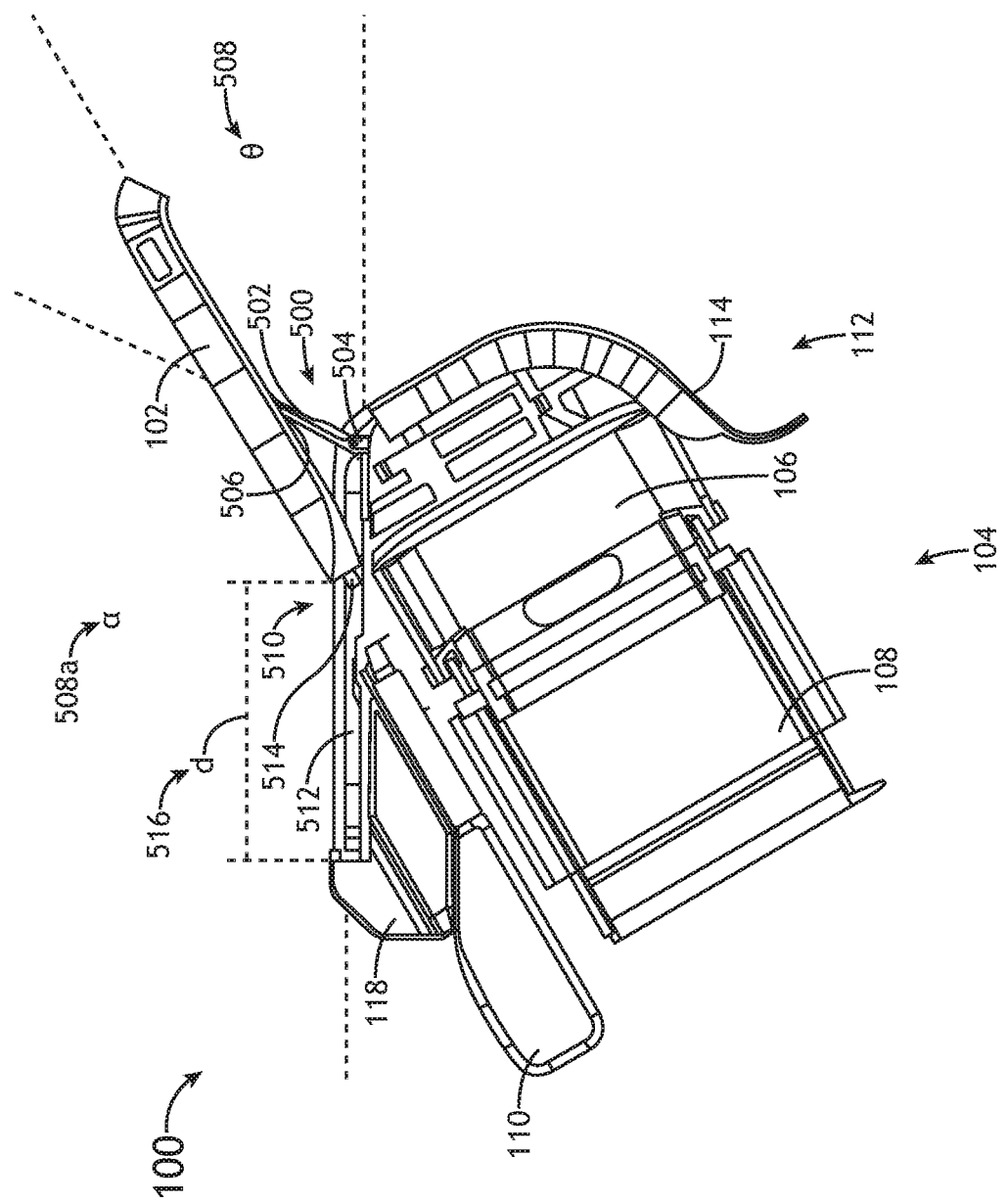
FIG. 5E illustrates an aircraft passenger compartment with an accessibility door, in accordance with one or more embodiments of the disclosure.
Figure 5F:
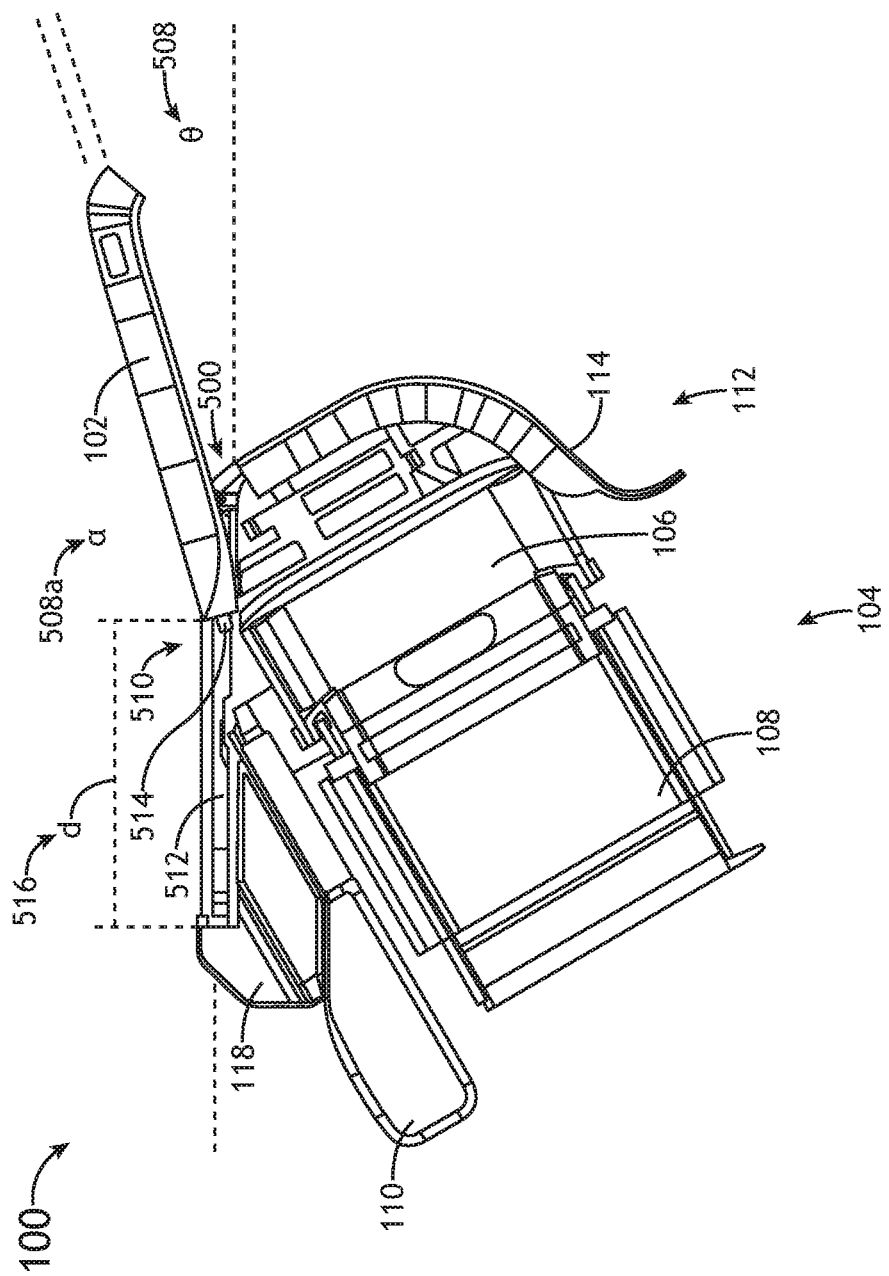
FIG. 5F illustrates an aircraft passenger compartment with an accessibility door, in accordance with one or more embodiments of the disclosure.

FIGS. 3A and 3B illustrate an aircraft 300 of a passenger aircraft, in accordance with one or more embodiments of the disclosure. Depending on the arrangement of multiple aircraft passenger compartments 100 within the aircraft 300, the accessibility door 102 as illustrated in FIGS. 1A-1E and FIGS. 2A-2D may temporarily impede travel within an aisle 302 of the aircraft 300. In addition, depending on the arrangement of multiple aircraft passenger compartments 100 within the aircraft 300, the accessibility door 102 of a first aircraft passenger compartment 100 as illustrated in FIGS. 1A-1E and FIGS. 2A-2D, when in the open position, may temporarily impede access to an adjacent aircraft passenger compartment 100 (e.g., a footwell 304 of the adjacent aircraft passenger compartment 100).

The multiple aircraft passenger compartments 100 may be positioned in an outward facing arrangement proximate to a fuselage 306 of the aircraft 300, such that a first aircraft passenger compartment 100 may be offset a select angle from an adjacent aircraft passenger compartment 100. It is noted herein, however, that the arrangement of the multiple aircraft passenger compartments 100 is not limited to being positioned proximate to the fuselage 306. Therefore, the above description should not be interpreted as a limitation on the present disclosure but merely an illustration.

The accessibility door 102 may rotate about one or more axes into an open position against the privacy shell 112 via one or more rotation assemblies and may translate about one or more axes via one or more translation assemblies. FIGS. 4A-4C and FIGS. 5A-5F illustrate the aircraft passenger compartment 100 including an accessibility door 102 configured to rotate about one or more axes and translate about one or more axes into the open position against the privacy shell 112, in accordance with one or more embodiments of the disclosure.

The one or more actuation assemblies may include one or more rotation assemblies 500. A rotation assembly 500 may include one or more linkages 502.

It is noted herein the rotation assembly 500 may include one or more auxiliary linkages, such that the one or more linkages 502 may be considered one or more primary linkages 502. The one or more primary linkages 502 may be a different length than the one or more auxiliary linkages. For example, the difference in length may allow for the spacing between the one or more primary linkages 502 and the one or more auxiliary linkages to change as the accessibility door 102 is actuated. By way of another example, the difference in length may require at least some of the one or more primary linkages 502 or the one or more auxiliary linkages to have a curved or bent section. It is noted herein, however, the one or more primary linkages 502 and the one or more auxiliary linkages may be the same length within the rotation assembly 500. In addition, it is noted herein the rotation assembly 500 may only include the one or more linkages 502 (e.g., no auxiliary linkages). Therefore, the above description should not be interpreted as a limitation on the present disclosure but merely an illustration.

The one or more primary linkages 502 and/or the one or more auxiliary linkages may be coupled to the privacy shell 112 via one or more hinge joints 504 (e.g., including one or more hinge plates and one or more pins, or the like). The one or more primary linkages 502 and/or the one or more auxiliary linkages may be coupled to the accessibility door 102 via one or more hinge joints 506 (e.g., including one or more hinge plates and one or more pins, or the like).

The accessibility door 102 may include a range of actuation having a select angle of rotation theta (θ) 508 between the closed position and the open position via the one or more rotation assemblies 500. For example, the angle of otation θ 508 may range between 0 degrees (e.g., when closed) and 90 degrees (e.g., when open) via the one or more rotation assemblies 500. In general, the angle of rotation θ 508 may change (e.g., increase when the accessibility door 102 actuates to an intermediate position, and then decrease when the accessibility door 102 actuates to a final position) as the accessibility door 102 is actuated between the closed position and the open position via the one or more rotation assemblies 500. For example, as illustrated in FIGS. 5A-5F, the angle of rotation θ 508 may increase as the accessibility door actuates from the closed position to the intermediate position, and the angle of rotation θ 508 may decrease as the accessibility door actuates from the intermediate position to the open position. By way of another example, as illustrated in FIGS. 5A-5F, the angle of rotation θ 508 may increase as the accessibility door actuates from the open position to the intermediate position, and the angle of rotation θ 508 may decrease as the accessibility door actuates from the intermediate position to the closed position.

A select angle between the privacy shell base 118 and the one or more primary linkages 502 may include a range of actuation having a select angle of rotation alpha (α) 508a between the closed position and the open position. For example, the angle of rotation α 508a may range between 0 degrees (e.g., when closed) and 180 degrees (e.g., when open). In general, the angle of rotation α 508a may change (e.g., increase or decrease, depending on the direction of actuation) as the privacy shell base 118 is actuated between the closed position and the open position. For example, as illustrated between FIGS. 5A-5F, the angle of rotation α 508a may increase during the transition between the closed position and the open position, and the angle of rotation α 508a may decrease during the transition between the open position and the closed position.

The accessibility door 102, the privacy shell 112, and/or the one or more rotation assemblies 500 may include one or more actuation inhibitors configured to prevent the accessibility door 102 from opening beyond a select angle.

The one or more actuation assemblies may include one or more translation assemblies 510. A translation assembly 510 may include one or more tracks or rails 512 and one or more sliders 514 configured to actuate along the one or more tracks 512. For example, the one or more tracks or rails 512 may be coupled to the privacy shell base 118 and the one or more sliders 514 may be coupled to the accessibility door 102. By way of another example, the one or more tracks 512 may be coupled to the accessibility door 102 and the one or more sliders 514 may be coupled to the privacy shell base 118.

The accessibility door 102 may include a range of actuation having a select distance (d) 516 between the closed position and the open position via the one or more translation assemblies 510. In general, the distanced 516 may change (e.g., increase or decrease, depending on the direction of actuation) as the accessibility door 102 is actuated between the closed position and the open position via the one or more translation assemblies 510. For example, as illustrated between FIGS. 5A-5F, the distance d 516 may increase during the transition between the closed position and the open position, and the distance d 516 may decrease during the transition between the open position and the closed position.

The accessibility door 102 may be configured to actuate via the one or more rotation assemblies 500 and the one or more translation assemblies 510 simultaneously (e.g., the accessibility door 102 rotates via the one or more rotation assemblies 500 as the accessibility door 102 translates via the one or more translation assemblies 510) for a smooth, single-stage transition between the closed position and the open position instead of a multi-stage actuation. It is noted herein, however, that the accessibility door 102 may be configured to fully translate via the one or more translation assemblies 510 before being rotated via the one or more rotation assemblies 500. In addition, it is noted herein, however, that the accessibility door 102 may be configured to fully rotate via the one or more rotate assemblies 500 before being translated via the one or more translation assemblies 510. Therefore, the above description should not be interpreted as a limitation on the present disclosure but merely an illustration.

Although embodiments of the disclosure are directed to the accessibility door 102 being actuated both via the one or more rotation assemblies 500 and the one or more translation assemblies 510, it is noted herein the accessibility door 102 may be translated only via the one or translation assemblies 510. For example, the accessibility door 102 may translate along a first axis via a first translation assembly 510 and may translate along a second axis via a second translation assembly 510, the first axis and the second axis being set at an angle to one another. Therefore, the above description should not be interpreted as a limitation on the present disclosure but merely an illustration.

It is noted herein the accessibility door 102, the privacy shell 112, the one or more rotation assemblies 500, and/or the one or more translation assemblies 510 may include components for an interlocking assembly configured to lock the accessibility door 102 in the open position, in addition or instead of interlocking assembly 120 configured to lock the accessibility door 102 in the closed position. Therefore, the above description should not be interpreted as a limitation on the present disclosure but merely an illustration.

Figure 6A:
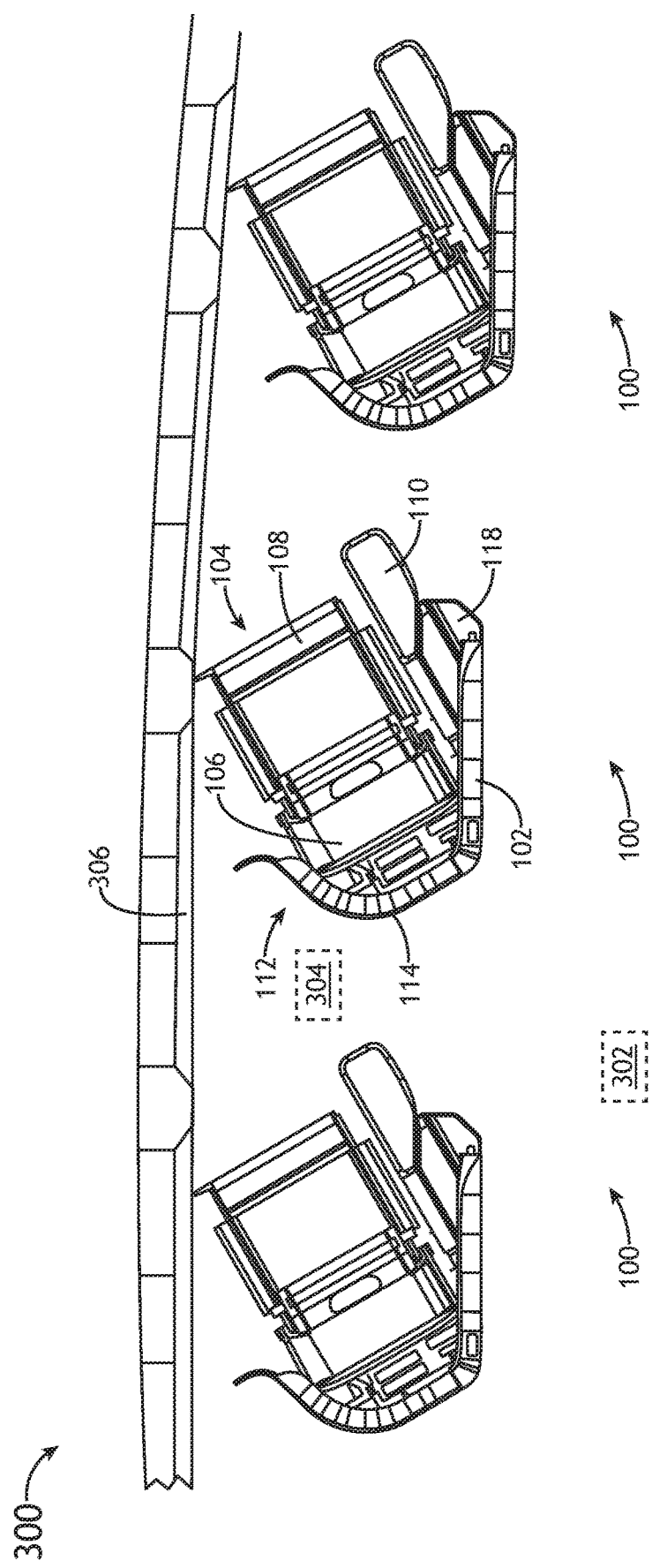
FIG. 6A illustrates an aircraft cabin including an aircraft passenger compartment with an accessibility door, in accordance with one or more embodiments of the disclosure.
Figure 6B:
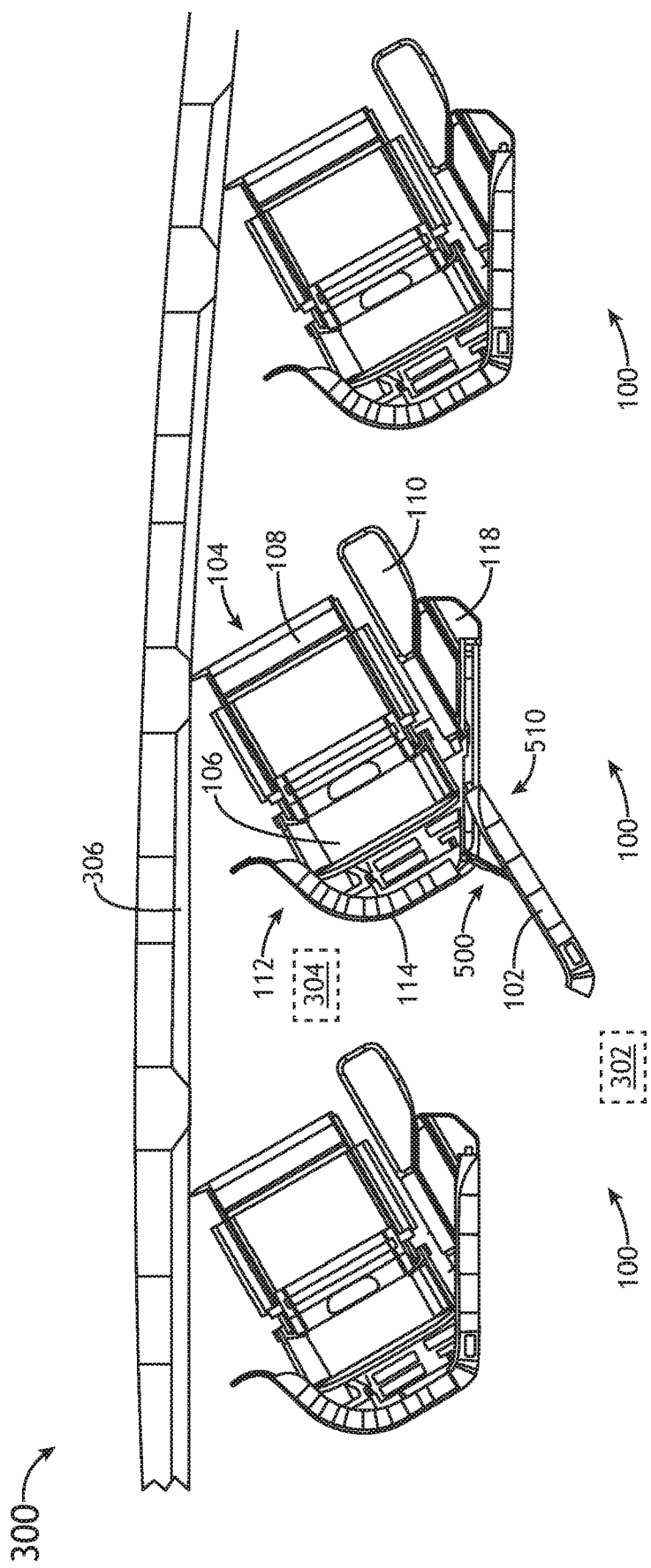
FIG. 6B illustrates an aircraft cabin including an aircraft passenger compartment with an accessibility door, in accordance with one or more embodiments of the disclosure.

FIGS. 6A and 6B illustrate the aircraft 300 of a passenger aircraft, in accordance with one or more embodiments of the disclosure. Depending on the arrangement of multiple aircraft passenger compartments 100 within the aircraft 300, the accessibility door 102 as illustrated in FIGS. 4A-4C and FIGS. 5A-5F may temporarily impede travel within the aisle 302 of the aircraft 300. It is noted herein, however, that the accessibility door 102 of a first aircraft passenger compartment 100 as illustrated in FIGS. 4A-4C and FIGS. 5A-5F, when in the open position, may not impede access to an adjacent aircraft passenger compartment 100, depending on the arrangement of multiple aircraft passenger compartments 100 within the aircraft 300 (e.g., a footwell 304 of the adjacent aircraft passenger compartment 100).

The multiple aircraft passenger compartments 100 may be positioned in an outward facing arrangement proximate to the fuselage 306 of the aircraft 300, such that a first aircraft passenger compartment 100 may be offset a select angle from an adjacent aircraft passenger compartment 100. It is noted herein, however, that the arrangement of the multiple aircraft passenger compartments 100 is not limited to being positioned proximate to the fuselage 306. Therefore, the above description should not be interpreted as a limitation on the present disclosure but merely an illustration.

It is noted herein one or more of the accessibility door 102, the aircraft seat 104, and/or the armrest 110 may be actuated manually (e.g., via a mechanical force provided directly or indirectly to the accessibility door 102, the aircraft seat 104, and/or the armrest 110). In addition, it is noted herein one or more of the accessibility door 102, the aircraft seat 104, and/or the armrest 110 may be actuated electronically. Further, it is noted herein the aircraft cabin 300 may include one or more controllers coupled (e.g., physically and/or communicatively coupled) to and configured to monitor and/or control the actuation of the accessibility door 102, the aircraft seat 104, and/or the armrest 110 (e.g., via a control panel). For example, the controller and/or the control panel may be positioned in the aircraft passenger compartment 100 for use by a passenger. By way of another example, the controller and/or the control panel may be positioned on an external surface of the aircraft passenger compartment 100 for use by a crew member.

The one or more controllers may include one or more processors and memory. The memory may store one or more sets of program instructions. The one or more processors may be configured to execute the one or more sets of program instructions to carry out one or more of the various steps described throughout the present disclosure. The one or more controllers may include one or more communication interfaces. The one or more controllers may include a user interface. The user interface may include one or more display devices. The user interface may include one or more user input devices.

In this regard, the aircraft passenger compartment 100 may allow for increased access to the aircraft seat 104 for persons with disabilities, for crew members assisting persons with disabilities, or the like. In addition, the actuatable armrest 110 of the aircraft passenger compartment 100 may meet aviation guidelines and/or standards (e.g., for passenger accessibility requirements, resistance to external force requirements, weight-bearing requirements, load-bearing requirements, or the like). Further, the accessibility door 102 of the aircraft passenger compartment 100 may be configured to reduce aisle blockage when the accessibility door 102 is in an open position.

Although the present disclosure is directed to the aircraft passenger compartment 100 with the accessibility door 102 being installed in the aircraft 300, it is noted herein the aircraft passenger compartment 100 with the accessibility door 102 (or a variant including one or more components of the aircraft passenger compartment 100 with the accessibility door 102) is not limited to the avionics environment and/or the aircraft components within the avionics environment and instead may be installed within any number of environments. For example, the environment may include any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art.

By way of another example, the environment may include a commercial or industrial establishment (e.g., a home or a business).

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger compartment, comprising:
   an accessibility door;
   a privacy shell, the accessibility door coupled to the privacy shell via at least one actuation assembly, the accessibility door configured to actuate between an open position and a closed position via the at least one actuation assembly, the at least one actuation assembly including: at least one rotation assembly and at least one translation assembly, the accessibility door and the privacy shell separated by a distance configured to change as the accessibility door actuates between the open position and the closed position, the accessibility door configured to actuate between the open position and the closed position via the at least one rotation assembly and the at least one translation assembly, the accessibility door configured to rotate about one or more vertical axes into an open position against the privacy shell via the at least one rotation assembly and the accessibility door configured to translate along at least one track and at least one slider, the accessibility door including a range of actuation having a select angle of rotation between the closed position and the open position via the at least one rotation assembly, the angle of rotation increasing during the transition between the closed position and the open position, the angle of rotation decreasing during the transition between the open position and the closed position;
   an aircraft seat; and
   a privacy shell base, the privacy shell being coupled to the privacy shell base, at least a portion of the privacy shell configured to conform to at least a portion of the aircraft seat, the privacy shell base configured to support the accessibility door at a height above a floor of an aircraft cabin including the aircraft passenger compartment, the height selected to allow access to the aircraft seat over the privacy shell base when the accessibility door is in the open position.

2. The aircraft passenger compartment of claim 1, the privacy shell including one or more privacy shell elements, at least one privacy shell element of the one or more privacy shell elements configured to conform to the at least the portion of the aircraft seat.

3. The aircraft passenger compartment of claim 1, the at least one slider configured to actuate along the at least one track.

4. The aircraft passenger compartment of claim 3, the at least one track coupled to the privacy shell base, the at least one slider coupled to the accessibility door.

5. The aircraft passenger compartment of claim 1, comprising:
   an interlocking assembly, the interlocking assembly configured to couple the accessibility door to the privacy shell base when the accessibility door is in the closed position.

6. The aircraft passenger compartment of claim 5, the accessibility door configured to operate as a privacy shell element of the privacy shell when the accessibility door is in the closed position and the interlocking assembly couples the accessibility door to the privacy shell base.

7. The aircraft passenger compartment of claim 1, the at least one rotation assembly including a first linkage and a second linkage, the first linkage and the second linkage each being coupled to the privacy shell via one or more hinge joints, the first linkage and the second linkage each being coupled to the accessibility door via one or more additional hinge joints.

8. The aircraft passenger compartment of claim 7, the first linkage being greater in length than the second linkage.

9. The aircraft passenger compartment of claim 7, at least one of the first linkage or the second linkage including a curved section.

10. The aircraft passenger compartment of claim 1, comprising:
    an armrest, the armrest configured to be actuated between a stowed position and a deployed position, the armrest configured to be in the stowed position to allow access to the aircraft seat over the armrest when the accessibility door is in the open position.

11. The aircraft passenger compartment of claim 10, the privacy shell base configured to conform to a portion of the armrest when the armrest is in the stowed position.

12. The aircraft passenger compartment of claim 11, a top surface of the privacy shell base and a top surface of the armrest being the height from the floor of the aircraft cabin.

13. An aircraft passenger compartment, comprising:
    a privacy shell, the accessibility door coupled to the privacy shell via at least one actuation assembly, the accessibility door configured to actuate between an open position and a closed position via the at least one actuation assembly, the at least one actuation assembly including: at least one rotation assembly and at least one translation assembly, the accessibility door and the privacy shell separated by a distance configured to change as the accessibility door actuates between the open position and the closed position, the accessibility door configured to actuate between the open position and the closed position via the at least one rotation assembly and the at least one translation assembly, the accessibility door configured to rotate about one or more vertical axes into an open position against the privacy shell via the at least one rotation assembly and the accessibility door configured to translate along at least one track and at least one slider, the accessibility door including a range of actuation having a select angle of rotation between the closed position and the open position via the at least one rotation assembly, the angle of rotation increasing during the transition between the closed position and the open position, the angle of rotation decreasing during the transition between the open position and the closed position;
    an aircraft seat; and
    a privacy shell base, the privacy shell being coupled to the privacy shell base, at least a portion of the privacy shell configured to conform to a backrest of the aircraft seat, the privacy shell base configured to support the accessibility door at a height above a floor of an aircraft cabin including the aircraft passenger compartment, the height selected to allow access to the aircraft seat over the privacy shell base when the accessibility door is in the open position.

* * * * *